US007386031B2

(12) United States Patent
Seki et al.

(10) Patent No.: US 7,386,031 B2
(45) Date of Patent: Jun. 10, 2008

(54) MULITCARRIER CDMA TRANSMISSION SYSTEM AND TRANSMISSION METHOD

(75) Inventors: Hiroyuki Seki, Kawasaki (JP); Daisuke Jitsukawa, Kawasaki (JP); Yoshinori Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 391 days.

(21) Appl. No.: 10/783,893

(22) Filed: Feb. 20, 2004

(65) Prior Publication Data
US 2004/0190598 A1 Sep. 30, 2004

Related U.S. Application Data

(63) Continuation of application No. PCT/JP01/07451, filed on Aug. 30, 2001.

(51) Int. Cl.
H04B 1/00 (2006.01)
(52) U.S. Cl. .................... 375/146; 375/141
(58) Field of Classification Search ........... 375/147, 375/141; 370/208, 335, 342, 441
See application file for complete search history.

(56) References Cited

U.S. PATENT DOCUMENTS

| 5,555,268 | A  | * | 9/1996 | Fattouche et al. | ........... | 375/141 |
| 6,104,746 | A  | * | 8/2000 | Ishikawa et al. | ............ | 375/140 |
| 6,347,220 | B1 | * | 2/2002 | Tanaka et al. | ............ | 455/277.2 |
| 6,400,679 | B1 | * | 6/2002 | Suzuki | ................ | 370/208 |
| 7,106,781 | B2 | * | 9/2006 | Agee et al. | ................ | 375/141 |

FOREIGN PATENT DOCUMENTS

| EP | 786890 | 7/1997 |
| EP | 938193 | 8/1999 |
| GB | 2335572 | 9/1999 |
| JP | 11-317712 | 11/1999 |
| JP | 2001-111519 | 4/2001 |
| JP | 2001-144724 | 5/2001 |
| WO | 9837638 | 8/1998 |

OTHER PUBLICATIONS

Wilan, "Spread Spectrum Wireless Technology", Sep. 2000.*
Corrected International Preliminary Examination Report, Apr. 12, 2002.
International Preliminary Examination Report, Apr. 12, 2002.
Supplementary European Search Report dated Jun. 12, 2007 for corresponding European Application EP 01 96 1186.

* cited by examiner

Primary Examiner—Mohammed Ghayour
Assistant Examiner—Juan Alberto Torres
(74) Attorney, Agent, or Firm—Katten Muchin Rosenman LLP

(57) ABSTRACT

In multicarrier transmission for multiplying transmit data individually by each code constituting orthogonal codes and transmitting each result of multiplication by a prescribed subcarrier, a plurality of different subcarriers are assigned exclusively to each user and each user performs multicarrier transmission of the transmit data by the subcarriers assigned. Further, a base station assigns a plurality of different subcarriers to each user exclusively, applies beam-forming processing on a per-user basis and performs multicarrier transmission of transmit data to each user by the subcarriers assigned.

4 Claims, 17 Drawing Sheets

FIG. 10 PRIOR ART
(a) 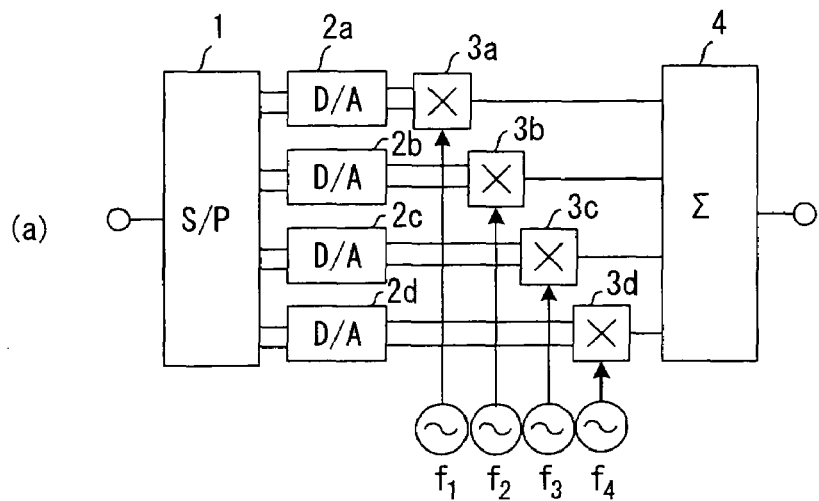
(b) 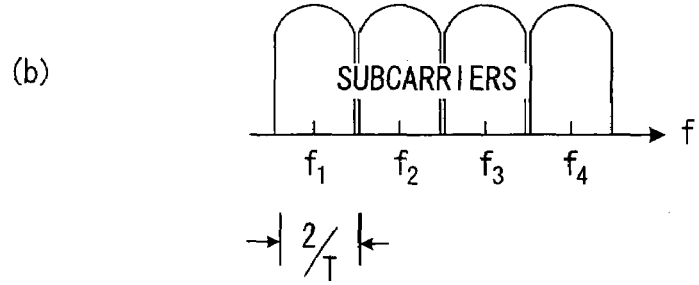
FIG. 11 PRIOR ART
(a) 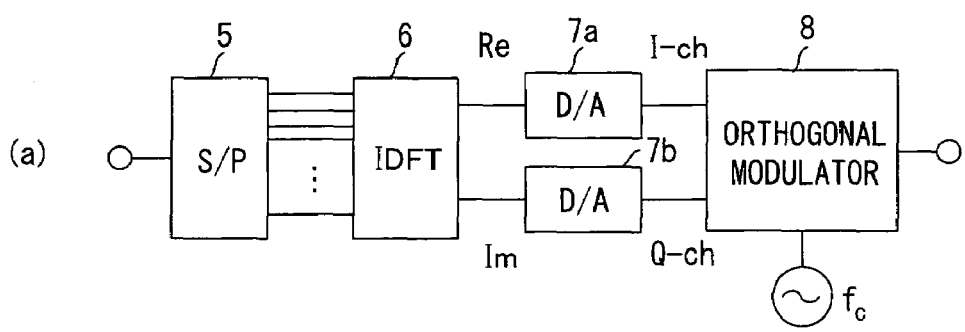
(b) 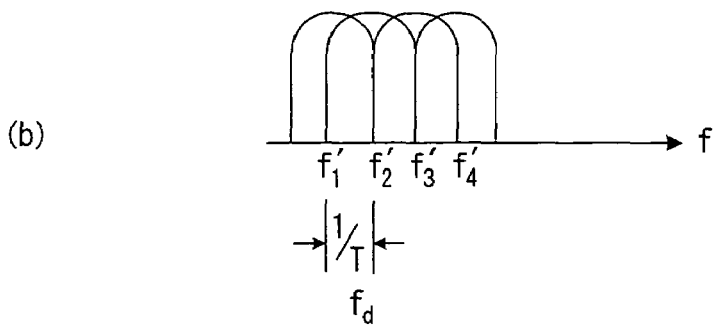

FIG. 24 PRIOR ART
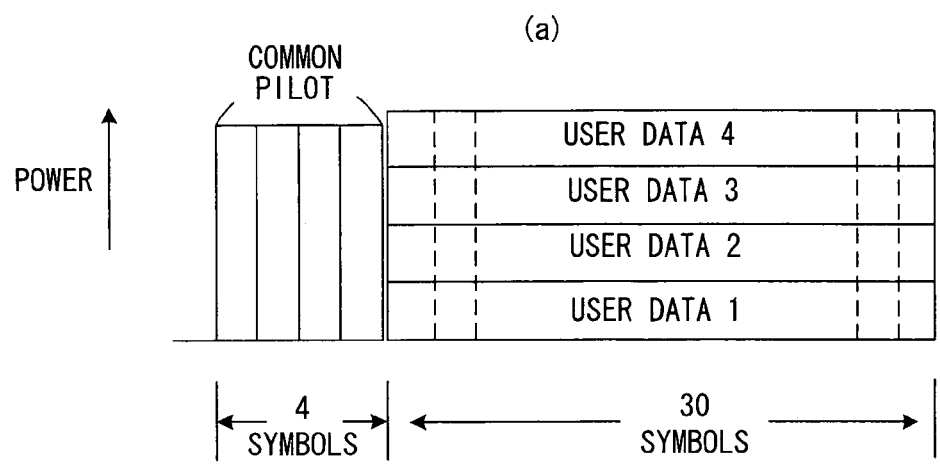
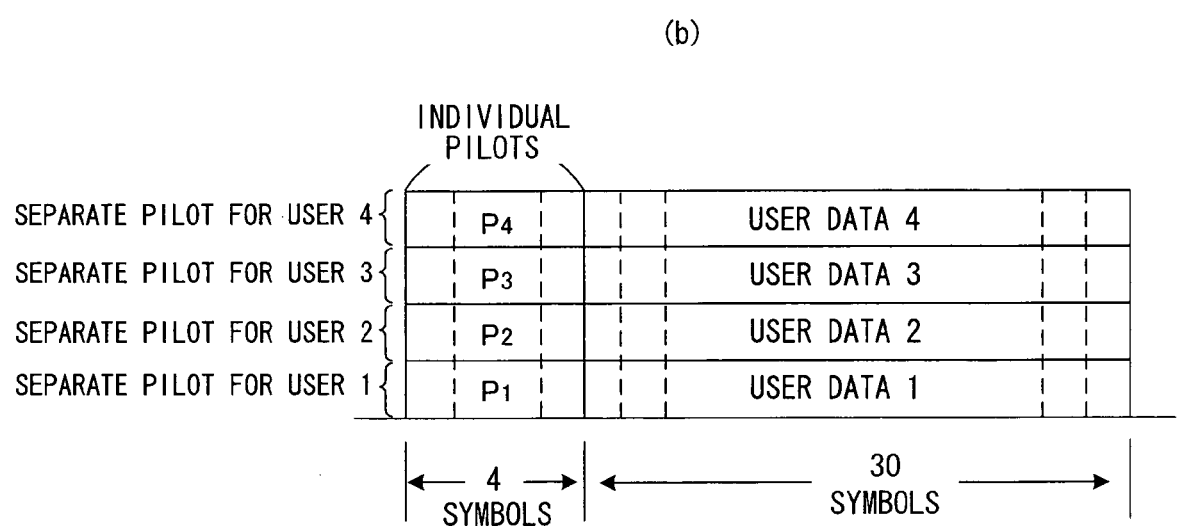

MULITCARRIER CDMA TRANSMISSION SYSTEM AND TRANSMISSION METHOD

This application is a continuation of international application number PCT/JP01/07451, filed Aug. 30, 2001 and is still pending.

BACKGROUND OF THE INVENTION

This invention relates to a multicarrier CDMA transmission system and transmission method. More particularly, the invention relates to a multicarrier CDMA transmission system and transmission method for subjecting transmit data to a serial-to-parallel conversion, multiplying each symbol of the obtained parallel data individually by each code constituting orthogonal codes, and multicarrier-transmitting each result of multiplication by a prescribed subcarrier.

Multicarrier modulation schemes have become the focus of attention as next-generation mobile communication schemes. Using multicarrier modulation not only makes it possible to implement wideband, high-speed data transmission but also enables the effects of frequency-selective fading to be mitigated by narrowing the band of each subcarrier. Further, using orthogonal frequency division multiplexing not only makes it possible to raise the efficiency of frequency utilization but also enables the effects of inter-symbol interference to be eliminated by providing a guard interval for every OFDM symbol.

(a) in FIG. 10 is a diagram useful in describing a multicarrier transmission scheme. A serial/parallel converter 1 converts serial data to parallel data and inputs the parallel data to orthogonal modulators 3a to 3d via D/A converter 2a to 2d, respectively. In the Figure, the conversion is to parallel data comprising four symbols. Each symbol includes an in-phase component and a quadrature component. The orthogonal modulators 3a to 3d subject each of the symbols to orthogonal modulation by subcarriers having frequencies $f_1$ to $f_4$ illustrated in (b) of FIG. 10, a combiner 4 combines the orthogonally modulated signals and a transmitter (not shown) up-converts the combined signal to a high-frequency signal and then transmits the high-frequency signal. With the multicarrier transmission scheme, the frequencies are arranged, as shown at (b), in such a manner that the spectrums will not overlap in order to satisfy the orthogonality of the subcarriers.

In orthogonal frequency division multiplexing, frequency spacing is arranged so as to null the correlation between a modulation band signal transmitted by an nth subcarrier of a multicarrier transmission and a modulation band signal transmitted by an (n+1)th subcarrier. If we assume that a symbol (a complex baseband signal) transmitted by the nth subcarrier (center frequency: $f_n$) is represented by $z_n$ ($=a_n+jb_n$), then we may write modulation band signal $s_n(t)=Re[z_n \exp(j2\pi f_n t)]$ (where Re represents the real part of the complex number). The requirement for the (n+1)th subcarrier to be orthogonal to the nth subcarrier is that the cross correlation between $s_n(t)$ and $s_{n+1}(t)$ be 0. If the frequency spacing between neighboring subcarriers is $f_d$ and the period of the symbol $z_n$ is T, then, in order for the cross correlation to become 0, it will suffice for $f_d=k/T$ (k=1, 2, . . . ) to hold and the minimum spacing will be $f_d=1/T$. A multicarrier multiplexing scheme having frequency spacing is an orthogonal frequency division multiplexing scheme.

(a) of FIG. 11 is a diagram of the structure of a transmitting apparatus that relies upon the orthogonal frequency division multiplexing scheme. A serial/parallel converter 5 converts serial data to parallel data comprising a plurality of symbols (I+jQ, which is a complex number). An IDFT (Inverse Discrete Fourier Transform) 6, which is for the purpose of transmitting the symbols as subcarriers having a frequency spacing shown in (b) of FIG. 11, applies an inverse discrete Fourier transform to the frequency data to effect a conversion to time data, and inputs the real and imaginary parts to an orthogonal modulator 8 through D/A converter 7a, 7b. The orthogonal modulator 8 subjects the input data to orthogonal modulation, and a transmitter (not shown) up-converts the modulated signal to a high-frequency signal. In accordance with orthogonal frequency division multiplexing, a frequency placement of the kind shown in (b) of FIG. 11 becomes possible, thereby enabling an improvement in the efficiency with which frequency is utilized.

In recent years, there has been extensive research in multicarrier CDMA schemes (MC-CDMA) and application thereof to next-generation wideband mobile communications is being studied. With MC-CDMA, partitioning into a plurality of subcarriers is achieved by serial-to-parallel conversion of transmit data and spreading of orthogonal codes in the frequency domain. Owing to frequency-selective fading, subcarriers distanced by their frequency spacing experience independent fading on an individual basis. Accordingly, by causing code-spread subcarrier signals to be distributed along the frequency axis by frequency interleaving, a despread signal can acquire frequency-diversity gain.

An orthogonal frequency/code division multiple access (OFDM/CDMA) scheme, which is a combination of OFDM and MC-CDMA, also is being studied. This is a scheme in which a signal, which has been divided into subcarriers by MC-CDMA, is subjected to orthogonal frequency multiplexing to raise the efficiency of frequency utilization.

A CDMA (Code Division Multiple Access) scheme multiplies transmit data having a bit cycle $T_s$ by spreading codes $C_1$ to $C_N$ of chip frequency Tc using a multiplier 9, as shown in FIG. 12, modulates the result of multiplication and transmits the modulated signal. Owing to such multiplication, a $2/T_s$ narrow-band signal NM can be spread-spectrum modulated to a 2/Tc wideband signal DS and transmitted, as shown in FIG. 13. Here Ts/Tc is the spreading ratio and, in the illustrated example, is the code length N of the spreading code. In accordance with this CDMA transmission scheme, an advantage acquired is that an interference signal can be reduced to 1/N.

According to the principles of multicarrier CDMA, N-number of items of copy data are created from a single item of transmit data D, as shown in FIG. 14, the items of copy data are multiplied individually by respective ones of codes $C_1$ to $C_N$, which are spreading codes (orthogonal codes), using multipliers $9_1$ to $9_N$, respectively, and products $DC_1$ to $DC_N$ undergo multicarrier transmission by N-number of subcarriers of frequencies $f_1$ to $f_N$ illustrated in (a) of FIG. 15. The foregoing relates to a case where a single item of symbol data undergoes multicarrier transmission. In actuality, however, as will be described later, transmit data is converted to parallel data of M symbols, the M-number of symbols are subjected to the processing shown in FIG. 14, and all results of M×N multiplications undergo multicarrier transmission using M×N subcarriers of frequencies $f_1$ to $f_{NM}$. Further, orthogonal frequency/code division multiple access can be achieved by using subcarriers having the frequency placement shown in (b) of FIG. 15.

FIG. 16 is a diagram illustrating the structure on the transmitting side of MC-CDMA. A data modulator 11 modulates transmit data and converts it to a complex baseband signal (symbol) having an in-phase component and a quadrature component. A time multiplexer 12 time-multiplexes the pilot of the complex symbol to the front of the transmit data. A serial/parallel converter 13 converts the input data to parallel data of M symbols, and each symbol is input to a spreader 14 upon being branched into N paths. The spreader 14 has M-number of multipliers $14_1$ to $14_M$. The multipliers $14_1$ to $14_M$ multiply the branched symbols individually by codes $C_1, C_2, \ldots, C_N$ constituting orthogonal codes and output the resulting signals. As a result, subcarrier signals $S_1$ to $S_{MN}$ for multicarrier transmission by N×M subcarriers are output from the spreader 14. That is, the spreader 14 multiplies the symbols of every parallel sequence by the orthogonal codes, thereby performing spreading in the frequency direction. Codes that differ for every user are assigned as the orthogonal codes used in spreading.

In the case of a downlink (transmission by a base station), a code multiplexer 15 code-multiplexes the subcarrier signals generated as set forth above and the subcarriers of other users generated through a similar method. That is, for every subcarrier, the code multiplexer 15 combines the subcarrier signals of a plurality of users conforming to the subcarriers and outputs the result. A frequency interleaver 16 rearranges the code-multiplexed subcarriers by frequency interleaving, thereby distributing the subcarrier signals along the frequency axis, in order to obtain frequency-diversity gain. An IFFT (Inverse Fast Fourier Transform) unit 17 applies an IFFT to the subcarrier signals that enter in parallel, thereby effecting a conversion to an OFDM signal (a real-part signal and an imaginary-part signal) on the time axis. A guard-interval insertion unit 18 inserts a guard interval into the OFDM signal, an orthogonal modulator 19 applies orthogonal modulation to the OFDM signal into which the guard interval has been inserted, and a radio transmitter 20 up-converts the signal to a radio frequency, applies high-frequency amplification and transmits the resulting signal from an antenna.

The total number of subcarriers is (spreading ratio N)× (number M of parallel sequences). Further, since fading that differs from subcarrier to subcarrier is sustained on the propagation path, a pilot is time-multiplexed onto all subcarriers and it is so arranged that fading compensation can be performed subcarrier by subcarrier on the receiving side. The time-multiplexed pilot is a common pilot that all users employ in channel estimation. In case of uplink, the signals of each of the users are combined on the propagation path and received at a base station.

FIG. 17 is a diagram useful in describing a serial-to-parallel conversion. Here a common pilot P has been time-multiplexed to the front of transmit data. If the common pilot is 4×M symbols and the transmit data is 30×M symbols, then M symbols of the pilot will be output from the serial/parallel converter 13 as parallel data the first four times, and thereafter M symbols of the transmit data will be output from the serial/parallel converter 13 as parallel data 30 times. As a result, the pilot can be time-multiplexed into all subcarriers and transmitted. By using this pilot on the receiving side, fading compensation becomes possible on a per-subcarrier basis.

FIG. 18 is a diagram useful in describing insertion of a guard interval. If an IFFT output signal conforming to M symbols is taken as one unit, then guard-interval insertion signifies copying the tail-end portion of this symbol to the leading-end portion thereof. Inserting a guard interval GI makes it possible to eliminate the effects of inter-symbol interference ascribable to multipath.

FIG. 19 is a diagram showing structure on the receiving side of MC-CDMA. A radio receiver 21 subjects a received multicarrier signal to frequency conversion processing, and an orthogonal demodulator 22 subjects the receive signal to orthogonal demodulation processing. A timing-synchronization/guard-interval removal unit 23 establishes receive-signal timing synchronization, removes the guard interval GI from the receive signal and inputs the result to an FFT (Fast Fourier Transform) unit 24. The FFT unit 24 converts a signal in the time domain to N×M-number of subcarrier signals. A frequency deinterleaver 25 rearranges the subcarrier signals in an order opposite that on the transmitting side and outputs the signals in the order of the subcarrier frequencies.

After deinterleaving is carried out, a fading compensator 26 performs channel estimation on a per-subcarrier basis using the pilot time-multiplexed on the transmitting side and applies fading compensation. In the Figure, a channel estimation unit $26a_1$ is illustrated only in regard to one subcarrier. However, such a channel estimation unit is provided for every subcarrier. The channel estimation unit $26a_1$ estimates the influence $\exp(j\phi)$ of fading on phase using the pilot signal, and a multiplier $26b_1$ multiplies the subcarrier signal of the transmit symbol by $\exp(-j\phi)$ to compensate for fading. A despreader 27 has M-number of multipliers $27_1$ to $27_M$. The multiplier $27_1$ multiplies N-number of subcarriers individually by codes $C_1, C_2, \ldots, C_N$ constituting orthogonal codes assigned to users and outputs the results. The other multipliers also execute similar processing. As a result, the fading-compensated signals are despread by spreading codes assigned to each of the users, and signals of desired users are extracted from the code-multiplexed signals by despreading.

Combiners $28_1$ to $28_M$ each add the N-number of results of multiplication that are output from respective ones of the multipliers $27_1$ to $27_M$, thereby creating parallel data comprising M-number of symbols. A parallel/serial converter 29 converts this parallel data to serial data, and a data demodulator 30 demodulates the transmit data.

FIG. 20 is an explanatory view illustrating the state of MC-CDMA fading fluctuation in a downlink from a base station. A subcarrier signal of a prescribed user that has been spread along the frequency axis is code-multiplexed onto the subcarrier signal of another user and sustains fading that differs for every subcarrier on the propagation path. In the case of an outgoing call from a base station, however, a code-multiplexed subcarrier signal of a different user sustains the same fading FD12 on each subcarrier. As a result, if fading compensation is carried out using channel estimation information estimated for every carrier by means of the pilot symbol, fading sustained by each user can be compensated for simultaneously, as indicated by FD12', orthogonality of the spreading codes of each of the users can be maintained and user signals will not interfere with one another. Accordingly, using a code having a high degree of orthogonality as the spreading code is extremely effective in an MC-CDMA scheme.

In the uplink, however, each user experiences different degrees of fading F1, F2 as shown in FIG. 21. Consequently, each subcarrier signal experiences independent fading user by user and orthogonality of the spreading code of each user is lost completely. For example, even if fading fluctuation F1 with respect to user 1 is compensated for by a fading compensator in the manner indicated at F1', fading fluctuation F2 with respect to user 2 becomes as indicated at F2'.

Accordingly, in a case where the MC-CDMA scheme for performing spreading in the frequency domain is applied to the uplink, a large deterioration in characteristics occurs.

Further, there are instances where a directional beam is emitted from a base station toward each user to transmit data. In such an instance it is necessary to provide an antenna array and carry out beam forming by causing a beam former to apply an array weight, which differs for every user, to the transmit data. FIG. 22 is a simple structural view of beam forming and illustrates an array antenna 31, a transmit beam former 32 for controlling the directivity of the beam by changing the array weight, and transmitters $33_1$ to $33_N$ for inputting transmit signals to antenna elements $ATT_1$ to $ATT_N$ that construct the array antenna. The transmit beam former 32 controls the array weight in accordance with the direction of the user (mobile station), thereby transmitting the beam toward the user upon changing the magnitude and phase of the transmit signal applied to each antenna element.

In a case where a signal to which a weight that differs for every user has been applied is code-multiplexed in order to implement beam forming, each subcarrier will sustain fading that differs for every user, in a manner similar to that the uplink in FIG. 21, if this signal traverses a propagation path that experiences multipath fading. In particular, the larger the angular spread of multipath, the more the fading experienced by each user is different from and independent of that of other users. Even when beam forming is carried out, therefore, the orthogonality of spreading codes is lost and the characteristic deteriorates significantly. If the array weight of each user has been decided in such a manner that the beam will not be directed toward other users in this case, the interference component toward other users is suppressed and therefore the problem of loss of spreading-code orthogonality is eliminated. In actuality, however, the side lobes of the beam interfere with other users and, hence, the influence of deterioration of characteristics due to loss of orthogonality is great.

As shown in FIG. 23, there are also cases where a sector is divided into a plurality, e.g., three, of directional zones A1, A2, A3, and a beam having the same directivity is transmitted by being directed toward those mobile stations MS11 to MS12, MS21 to MS22, MS31 to MS32 present in the same directional zone. In the case of such beam forming, it is necessary to use an array weight that differs for every directional zone. However, if a signal to which a weight that differs for every directional zone is code-multiplexed and the code-multiplexed signal traverses a propagation path that experience multipath fading, then, in a manner similar to that of FIG. 21, each subcarrier will sustain fading that differs for every directional zone. In such case, fading sustained by users in different directional zones becomes independent, orthogonality of spreading codes is lost and characteristics deteriorate markedly. In this case also, if the array weight of each directional zone has been decided in such a manner that the beam will not be directed toward other directional zones, the interference component toward other users is suppressed and therefore the problem of loss of spreading-code orthogonality is eliminated. In actuality, however, side lobes SB of the beam BM interfere with other users, as shown in FIG. 23, and, hence, the influence of deterioration of characteristics due to loss of orthogonality is great.

Furthermore, in a case where each subcarrier has sustained fading that differs for every user, channel estimation must be performed using an individual pilot for each user in order to compensate for fading. With MC-CDMA, channel estimation must be carried out with regard to each subcarrier before despreading is performed. To separate an individual pilot of each user, there is a method of utilizing the pattern of a pilot and a method of shifting the position along the frequency and time axes of the pilot user by user to thereby effect separation. In either case, power allocated to individual channels decreases as the number of individual channels increases. (a) in FIG. 24 illustrates a case where a common pilot is used and (b) of FIG. 24 a case where individual pilots are used. The power of each individual pilot is one-fourth that of the common pilot. The greater the number of individual pilots, therefore, the greater the decline in the accuracy of channel estimation. Further, depending upon the placement and position of the pilot pattern, the channel of each subcarrier must be estimated as by finding channel information between pilots (channel estimation information) by interpolation.

SUMMARY OF THE INVENTION

Accordingly, an object of the present invention is to so arrange it that the orthogonality of a spreading code will not be lost even when MC-CDMA transmission is performed on an uplink (i.e., in call origination from a mobile station).

Another object of the present invention is to avoid loss of the orthogonality of a spreading code even when MC-CDMA transmission is performed by applying beam forming in a downlink (i.e., in call origination from a base station).

A further object of the present invention is to realize excellent channel estimation accuracy even when individual pilots are used.

A further object of the present invention is to so arrange it that a narrow-band receiver can be used in MC-CDMA transmission.

In multicarrier transmission in which transmit data is converted to serial data, each symbol of parallel data obtained is output upon being multiplied individually by each code constituting orthogonal codes, and each result of multiplication is transmitted by a prescribed subcarrier, a plurality of subcarriers are assigned on a per-user basis and transmit data of a user is subjected to multicarrier transmission by the subcarriers assigned. If this arrangement is adopted, use is made of subcarriers having frequencies that differs for every user. As a result, interference on other users is eliminated and excellent multicarrier transmission becomes possible.

In this case, M-number of orthogonal codes are assigned to a user, parallel data comprising M-number of symbols is output by a serial-to-parallel conversion, an ith symbol of the parallel data is multiplied individually by each code constituting ith orthogonal codes, corresponding results of multiplication from among the results of multiplication of multiplication obtained for every symbol are added, and each result of addition is transmitted by the subcarrier assigned. If multicode multiplexing is thus performed, excellent multicarrier transmission that will not interfere with other users can be performed even with few subcarriers assigned to a user or even if the data transmission rate is high.

Further, multicarrier transmission is carried out upon assigning a plurality of subcarriers exclusively to each user. If this arrangement is adopted, interference upon other users is eliminated and excellent multicarrier transmission becomes possible even in a case where, in a downlink, a base station executes transmit beam-forming processing user by user and transmits the transmit data of each user upon performing frequency multiplexing. Further, in an uplink, interference upon other users is eliminated and excellent multicarrier transmission becomes possible by having the user transmit the transmit data to a base station by multicarrier transmission using the subcarriers assigned.

Further, the same subcarriers are assigned to a plurality of users, different orthogonal code is assigned to each of these users and code multiplexing is performed on the same subcarriers to send the transmit data of each user. If this arrangement is adopted, interference upon other users is eliminated and excellent multicarrier transmission becomes possible even in a case where beam forming is applied to a plurality of users present in the same directional zone and a multicarrier transmission is made from a base station using the same subcarriers.

Further, in a multicarrier transmission, a user extracts, by filtering, a receive signal component of a frequency domain of subcarriers that have been assigned to this user and performs demodulation processing using the extracted receive signal component. If this arrangement is adopted, multicarrier reception can be performed using a narrow-band receiver. Further, by performing transmission by dispersing subcarriers along the frequency axis using frequency interleaving, it can be so arranged that errors will not concentrate. This makes it possible to improve error-correction performance.

BRIEF DESCRIPTION OF THE DRAWINGS

FIG. 10 is a diagram useful in describing a multicarrier transmission scheme;

FIG. 11 is a diagram useful in describing an orthogonal frequency division multiplexing scheme;

FIG. 24 is a diagram useful in describing pilots.

DESCRIPTION OF THE PREFERRED EMBODIMENTS (A) Overview of the Invention (a) First Principle of the Invention FIG. 1 is a diagram useful in describing a first principle of the present invention and illustrates a case where the number of users is two for the sake of explanation.

Figure 1:
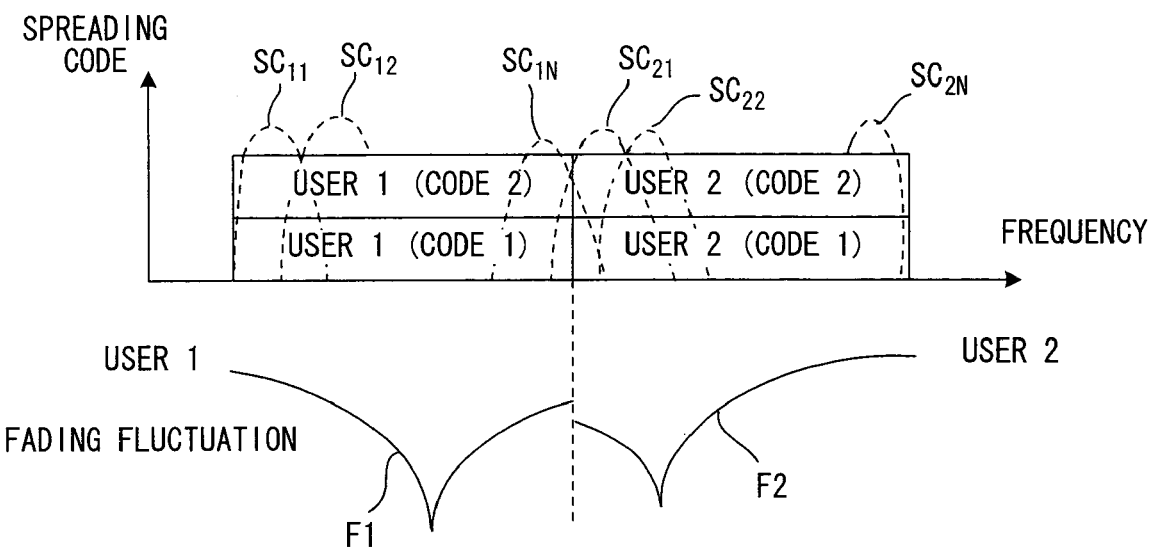
FIG. 1 is a diagram useful in describing a first principle of the present invention.

According to the present invention, subcarriers of prescribed frequencies are assigned exclusively to each user, as shown in FIG. 1. For example, subcarriers $SC_{11}$ to $SC_{1N}$ are assigned exclusively to user 1 and other subcarriers $SC_{21}$ to $SC_{2N}$ are assigned exclusively to user 2. Further, it is so arranged that multicode multiplexing is performed upon assigning a plurality of spreading codes to the same user. For example, orthogonal codes 1, 2 are assigned to user 1 and orthogonal codes 1, 2 are assigned to user 2.

If the above arrangement is adopted, a user is capable of using specific subcarriers exclusively. As a result, even if the fading characteristic differs for each of the users 1, 2, as indicated at F1, F2 in FIG. 1, there will be no interference between users and therefore the orthogonality of spreading codes will not be lost. Accordingly, by using the present invention, the superior characteristics of MC-CDMA can be maintained even in the case of an uplink and in a case where beam forming is used in a downlink. Furthermore, according to the present invention, a user is capable of using specific carriers exclusively and therefore a pilot that is time-multiplexed onto each subcarrier becomes a user-specific pilot. Moreover, since there will be no interference with the pilots of other users, one's own pilot can be detected reliably even in a case where the number of users increases, and there is no decline in channel estimation accuracy.

Further, a plurality of orthogonal codes are assigned to a user and multicode multiplexing is carried out. For example, orthogonal codes 1, 2 are assigned to user 1 and orthogonal codes 1, 2 are assigned also to user 2. If multicode multiplexing is thus performed, high-speed transmission using only some subcarriers becomes possible without lowering the transmission rate of the user.

Further, FIG. 1 is an explanatory view showing the state before frequency interleaving is performed on the transmitting side or after frequency deinterleaving has been performed on the receiving side. However, by dispersing the subcarriers in sole possession of the users along the frequency axis by a frequency interleaver, frequency-diversity gain can be obtained.

(b) Second Principle of the Invention

Figure 2:
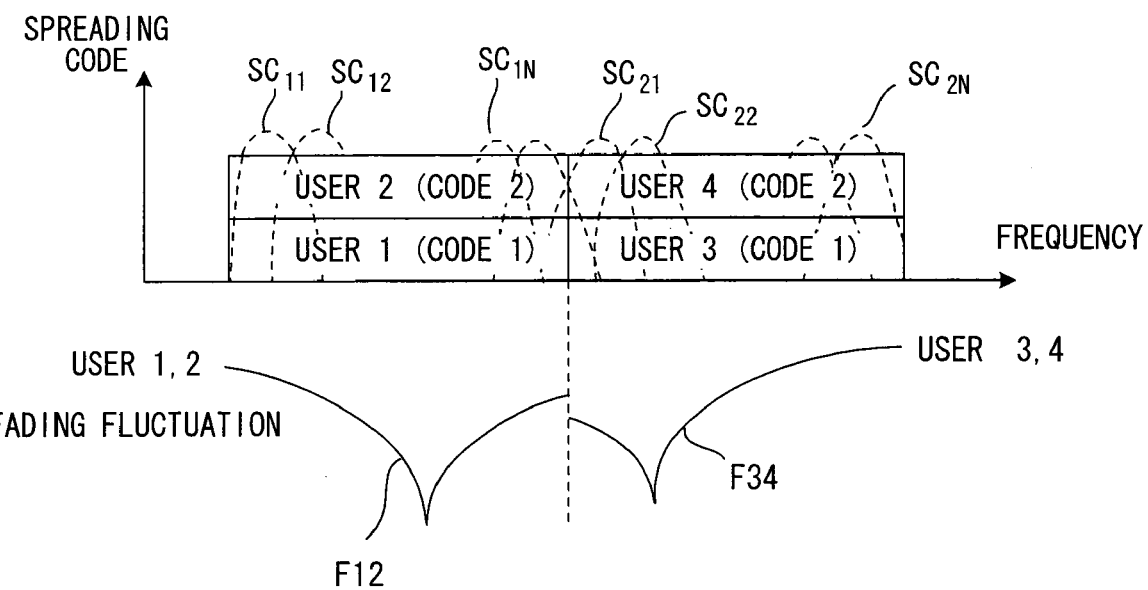
FIG. 2 is a diagram useful in describing a second principle of the present invention.

FIG. 2 is a diagram useful in describing a second principle of the present invention and illustrates a case where the number of users is four for the sake of explanation.

Figure 23:
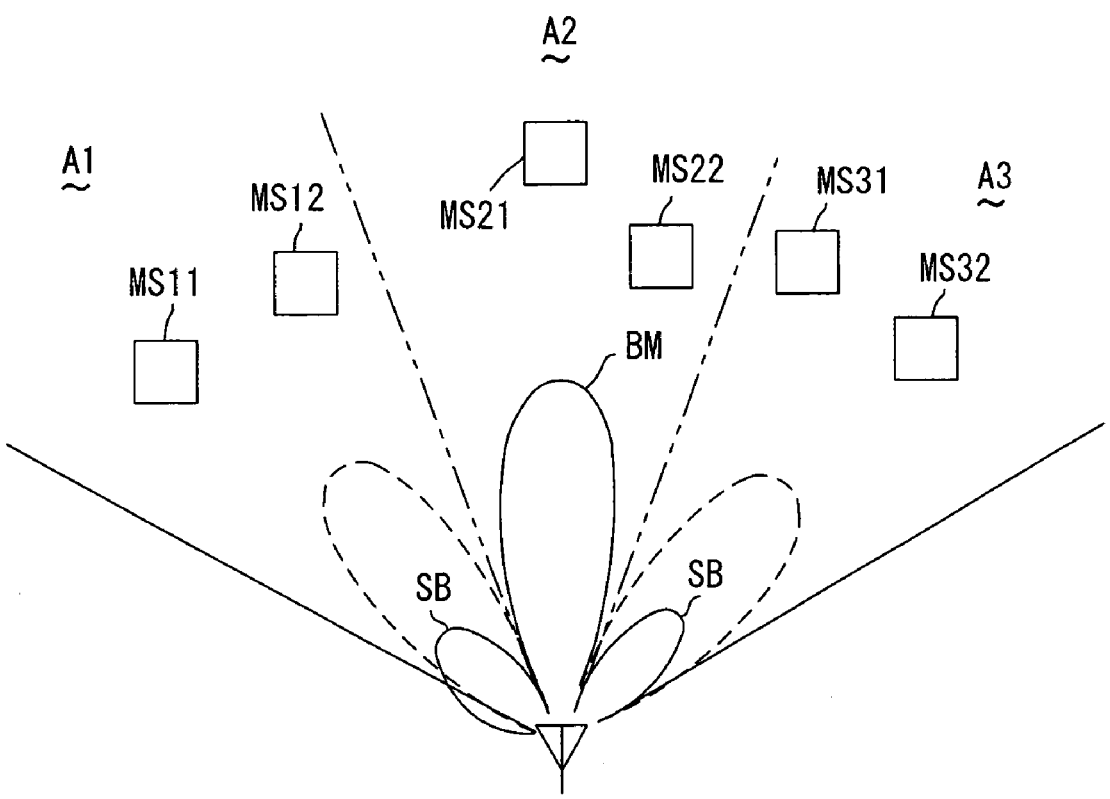
FIG. 23 is a diagram useful in describing beam forming in a case where a sector has been divided into a plurality of directional zones.

Assume that users 1 and 2 sustain identical fading and that users 3, 4 sustain identical fading, as illustrated at F12, F34 in FIG. 2. As such an environment in which identical fading is sustained, consider a case where a base station uses the same directional beam to transmit to a plurality of users, which belong to the same directional zone, by beam forming, as illustrated in FIG. 23.

Under such circumstances, the present invention assigns subcarriers of prescribed frequencies to the users 1, 2, assigns other subcarriers to the users 3, 4, assigns separate orthogonal codes to users to which the same subcarriers have been assigned, and implements MC-CDMA transmission. For example, subcarriers $SC_{11}$ to $SC_{1N}$ are assigned to users 1, 2 and subcarriers $SC_{21}$ to $SC_{2N}$ are assigned to users 3, 4. Further, orthogonal code 1 is assigned to users 1, 3 and orthogonal code 2 is assigned to users 2, 4.

Since the orthogonal codes between the users 1 and 2 (3 and 4) that experience identical fading remain intact, code multiplexing on the same subcarrier can be performed. This MC-CDMA transmission method is applicable to a case where beam forming is carried out in a downlink (an outgoing call from a base station). For example, in a case where users 1 and 2 are present in the same directional zone, a transmission is performed using the same directional beam. In other words, the array weights used by users 1 and 2 are the same and the same fading is sustained by each user even on a propagation path that experiences multipath fading. Similarly, a transmission is performed using the same directional beam in a case where the users 3, 4 are present in the same directional zone.

In such case there is no interference between users 1, 2 and users 3, 4 because the subcarriers are different. Further, since the fading sustained by the users 1, 2 is the same, orthogonality is not lost. Similarly, since the fading sustained by the users 3, 4 is the same, orthogonality is not lost. This means that excellent MC-CDMA transmission is possible.

(B) First Embodiment

Figure 3:
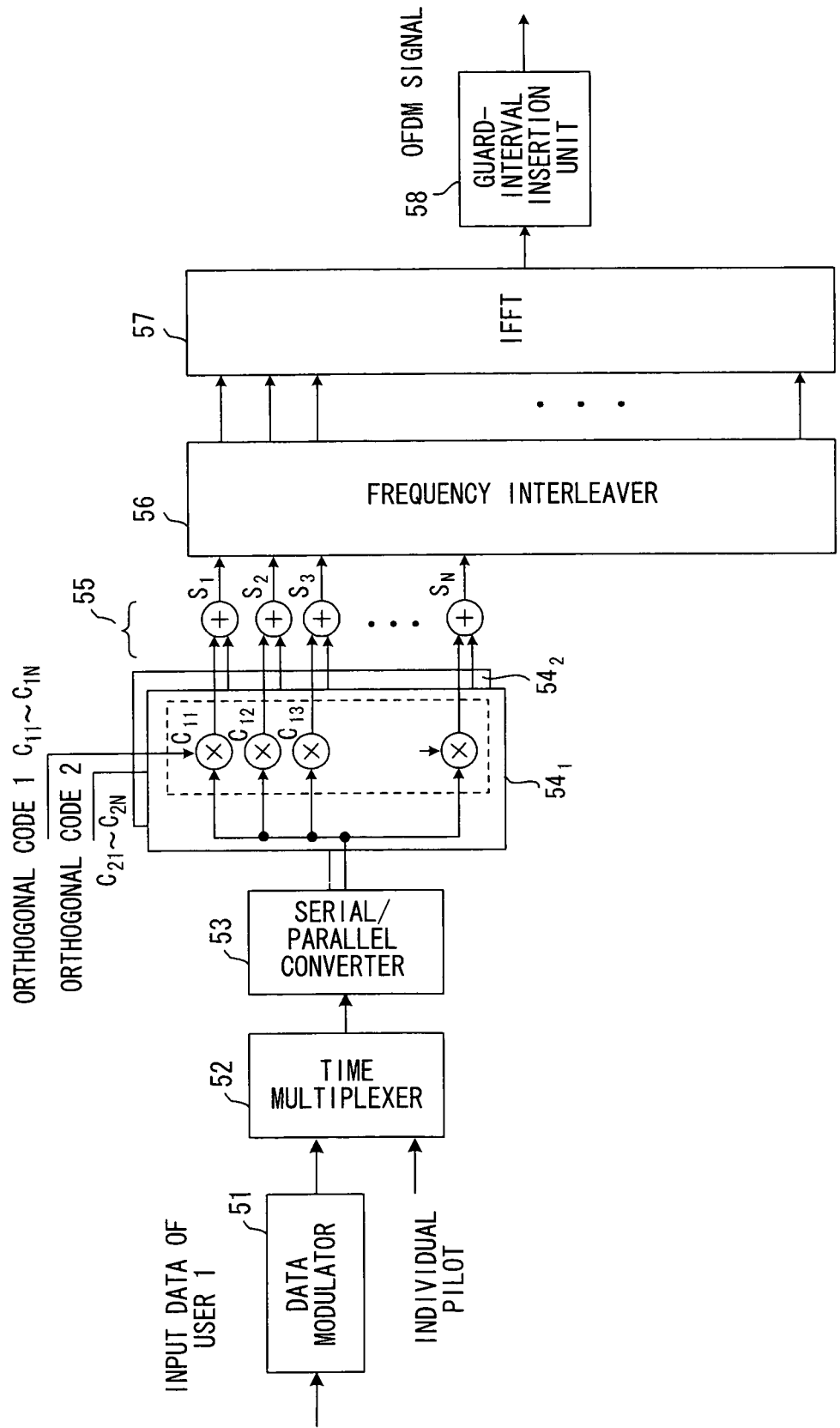
FIG. 3 is a block diagram of the transmitting side of a mobile station in the case of an uplink when subcarriers are assigned exclusively on a per-user basis.

FIG. 3 is a block diagram of the transmitting side of a mobile station in the case of an uplink when subcarriers are assigned exclusively on a per-user basis. FIG. 3 illustrates a case where subcarriers $SC_{11}$ to $SC_{1N}$ are used upon being assigned to user 1, and multicode multiplexing is performed upon assigning first and second orthogonal codes $C_{11}$ to $C_{1N}$, $C_{21}$ to $C_{2N}$ to user 1. The number N of subcarriers possessed exclusively by one user is the same as the spreading rate, and other users also perform multicode multiplexing similarly using other subcarrier sets. The number N of subcarriers possessed exclusively by one user may be a multiple of the spreading rate.

A data modulator 51 modulates transmit data and converts it to a complex baseband signal sequence (symbol sequence) having an in-phase component and a quadrature component. A time multiplexer 52 time-multiplexes the pilot of the plurality of symbols to the front of the transmit data. A serial/parallel converter 53 converts the input data to parallel data of M symbols (M=2 in this embodiment), and the symbols are input to respective ones of first and second spreaders 54$_1$, 54$_2$ upon being branched into N paths. The first spreader 54$_1$ has N-number of multipliers. The multipliers multiply the N-number of branched symbols individually by respective ones of the codes $C_{11}, C_{12}, \ldots, C_{1N}$ constituting the first orthogonal codes and output the resulting signals. Further, the second spreader 54$_2$ has N-number of multipliers. The multipliers multiply the N-number of branched symbols individually by respective ones of the codes $C_{21}, C_{22}, \ldots, C_{2N}$ constituting the second orthogonal codes and output the resulting signals. A combiner 55 has N-number of adders. Each adder adds the outputs of the corresponding multipliers in the first and second spreaders 54$_1$, 54$_2$, and the adders output subcarrier signals $S_1$ to $S_N$. The subcarrier signals $S_1$ to $S_N$ are multicode multiplexed signals obtained by multiplexing results of spreading the two symbols by respective ones of the orthogonal codes $C_{11}$ to $C_{1N}$, $C_{21}$ to $C_{2N}$.

A frequency interleaver 56 rearranges the code-multiplexed subcarriers $S_1$ to $S_N$ by frequency interleaving, thereby distributing the subcarrier signals along the frequency axis, in order to obtain frequency-diversity gain. An IFFT unit 57 applies an IFFT (Inverse Fast Fourier Transform) to the subcarrier signals that enter in parallel, thereby effecting a conversion to an OFDM signal (a real-part signal and an imaginary-part signal) on the time axis. A guard-interval insertion unit 58 inserts a guard interval into the OFDM signal, an orthogonal modulator (not shown) applies orthogonal modulation to the OFDM signal into which the guard interval has been inserted, and a radio transmitter up-converts the signal to a radio frequency, applies high-frequency amplification and transmits the resulting signal toward a base station from an antenna.

If the above arrangement is adopted, a user employs specific subcarriers exclusively and therefore orthogonality of spreading codes will not be lost even in a case where fading differs from user to user. Further, since multicode multiplexing is performed upon assigning a plurality of spreading codes to a user, high-speed transmission using only some subcarriers becomes possible without lowering the transmission rate of the user.

The embodiment of FIG. 3 relates to a case where the serial/parallel converter 53 has output parallel data of M (=2) symbols. However, M=1 or M≧3 may be adopted. The higher the transmission rate, the larger M, i.e., the greater the number of orthogonal codes assigned to a user.

Figure 4:
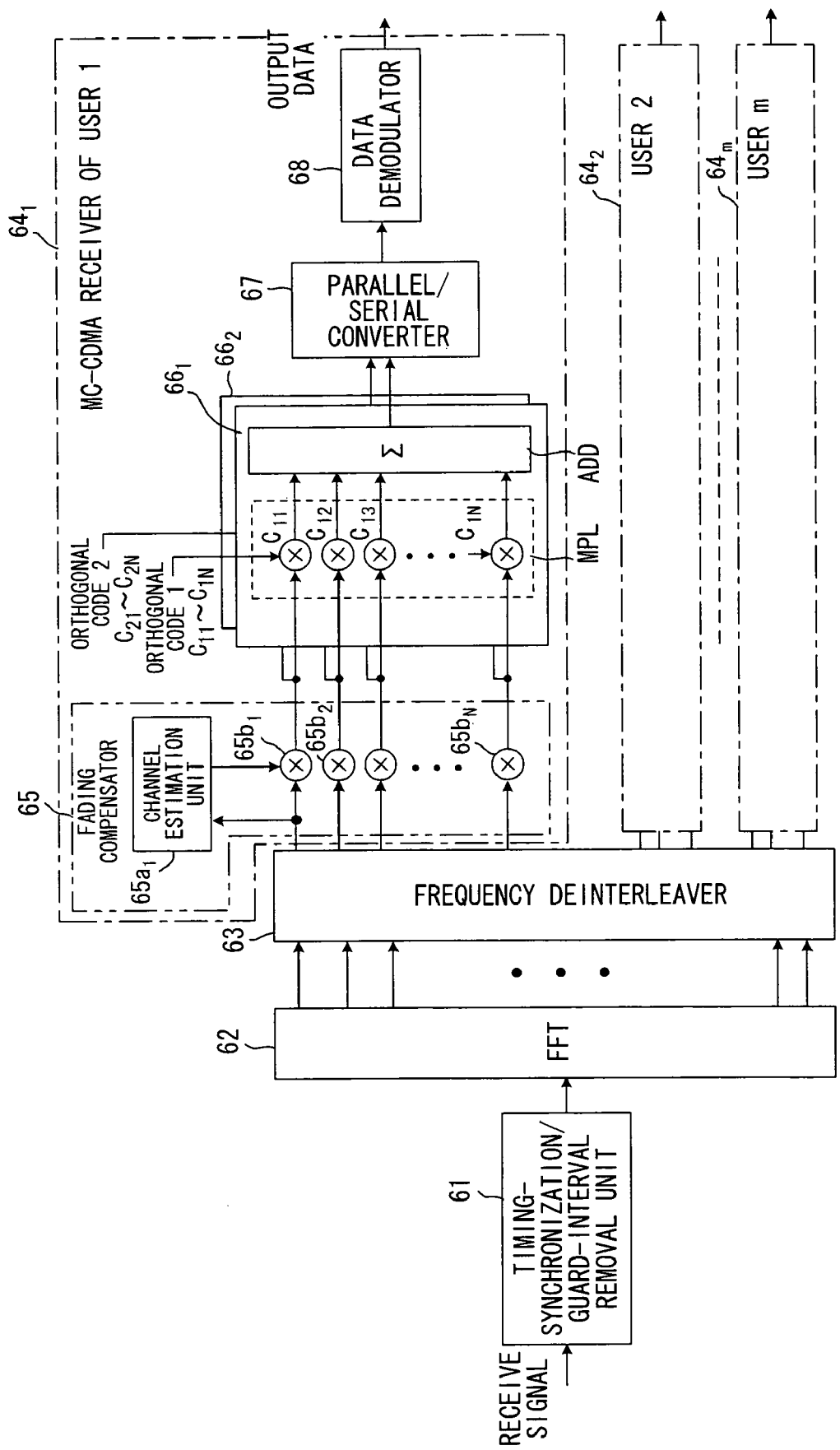
FIG. 4 is a block diagram of the receiving side of a base station according to a first embodiment.

FIG. 4 is a block diagram of the receiving side of a base station according to the first embodiment in which subcarriers are used upon being assigned exclusively user by user. The structure is such that the transmit data from a plurality of users can be demodulated individually.

A radio receiver (not shown) subjects a received multicarrier signal to frequency conversion processing, and an orthogonal demodulator subjects the receive signal to orthogonal demodulation processing and inputs the processed signal to a timing-synchronization/guard-interval removal unit 61. The latter establishes receive-signal timing synchronization, subsequently removes the guard interval GI from the receive signal and inputs the result to an FFT unit 62. The FFT unit 62 converts a signal in the time domain to a number of subcarrier signals. If we let N represent the number of subcarriers assigned exclusively to each user and let m represent the number of users that a single base station can accommodate, then the FFT unit 62 will output m×N subcarrier signals. A frequency deinterleaver 63 rearranges the subcarrier signals in an order opposite that on the transmitting side and, in the order of the subcarrier frequencies, inputs the first N-number of subcarrier signals to an MC-CDMA receiver 64$_1$ for user 1, inputs the next N-number of subcarrier signals to an MC-CDMA receiver 64$_2$ for user 2, and similarly inputs an mth N-number of subcarrier signals to an MC-CDMA receiver 64$_m$ for user m. The receivers 64$_1$ to 64$_m$ are similarly constructed and operate in a similar manner. Accordingly, only the operation of the MC-CDMA receiver 64$_1$ for user 1 will be described below.

After deinterleaving is carried out, the fading compensator 65 performs channel estimation on a per-subcarrier basis using the pilot time-multiplexed on the transmitting side and applies fading compensation. In the Figure, a channel estimation unit $65a_1$ is illustrated only in regard to one subcarrier. However, such a channel estimation, unit is provided for every subcarrier. The channel estimation unit $65a_1$ estimates the influence exp(jΦ) of fading on phase using the pilot signal, and a multiplier $65b_1$ multiplies the subcarrier signal of the transmit symbol by exp(–jΦ) to compensate for fading. Like the multiplier $65b_1$, multipliers $65b_2$- $65b_n$ compensate for fading.

First and second despreaders $66_1$, $66_2$ each have N-number of multipliers MPL and one adder ADD. The multiplier MPL of the first despreader $66_1$ multiplies N-number of subcarriers individually by codes $C_{11}$, $C_{12}$, . . . , $C_{1N}$ constituting the first orthogonal codes assigned to the user, and the adder ADD adds the results of multiplication from each of the multipliers and outputs the result as the first symbol of parallel data. The multiplier MPL of the second despreader $66_2$ multiplies N-number of subcarriers individually by codes $C_{21}$, $C_{22}$, . . . , $C_{2N}$ constituting the second orthogonal codes assigned to the user, and the adder ADD adds the results of multiplication from each of the multipliers and outputs the result as the second symbol of parallel data.

By virtue of the foregoing, a fading-compensated signal is despread by first and second orthogonal codes assigned to each user, and first and second symbols constituting the parallel data of user 1 is extracted by despreading from the user-multiplexed signals.

A parallel/serial converter 67 converts this parallel data to serial data, and a data demodulator 68 demodulates the transmit data.

In accordance with the first embodiment, a user employs specific subcarriers exclusively. As a result, there is no interference with other user signals and there is no loss of orthogonality. This makes it possible to improve the receive characteristics. In addition, a pilot that is time-multiplexed onto each subcarrier becomes a user-specific pilot. Moreover, since there will be no interference with the pilots of other users, one's own pilot can be detected reliably even in a case where the number of users increases, and there is no decline in channel estimation accuracy.

(C) Second Embodiment

Figure 5:
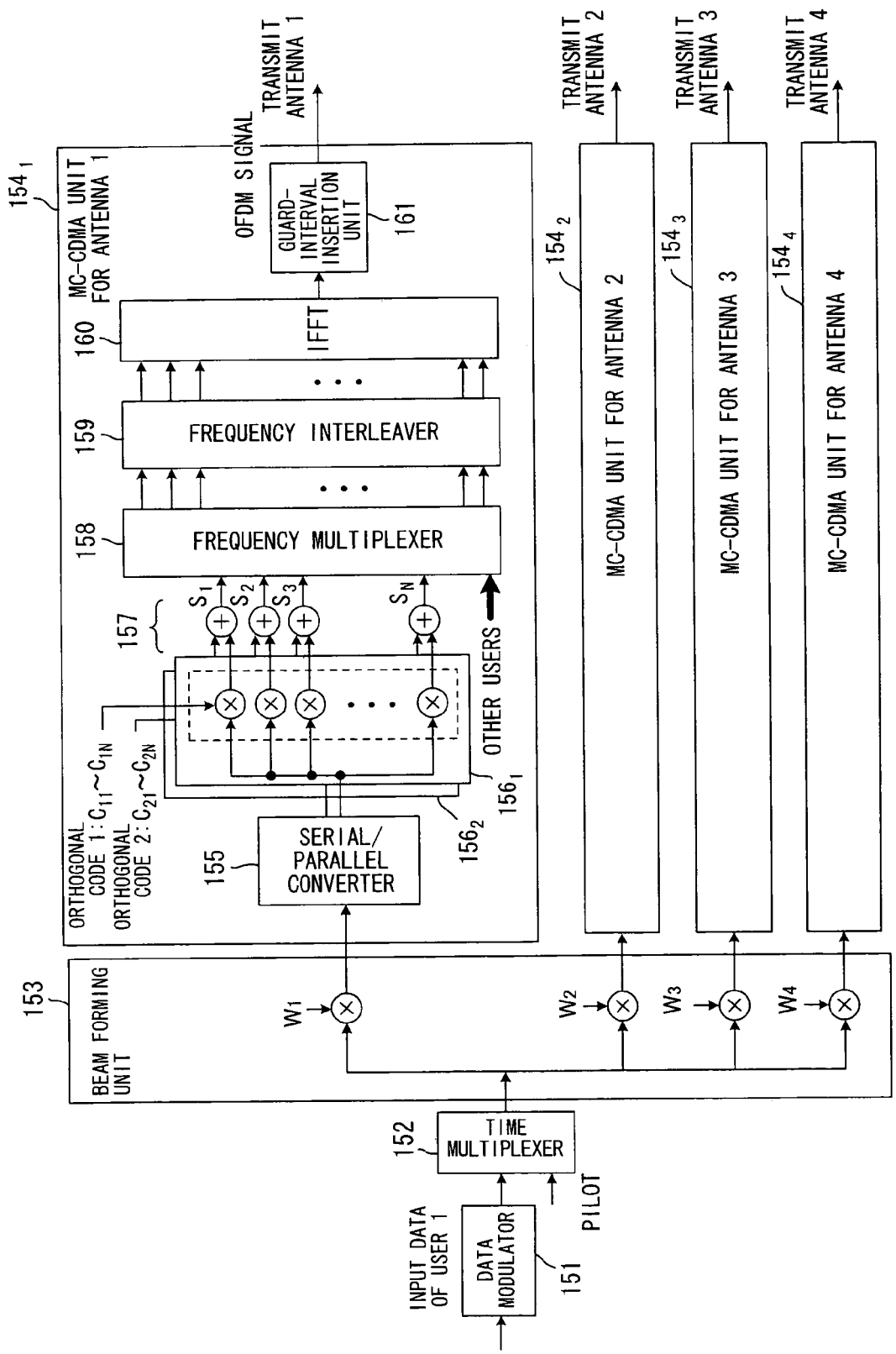
FIG. 5 is a block diagram of the transmitting side of a base station in a case where beam forming is used in a downlink.

FIG. 5 is a block diagram of the transmitting side (a block diagram of a base station) in a case where beam forming is used in a downlink (origination of a call from the base station). This is a case where a transmission is made by beam forming using a directional beam on a per-user basis. Further, the Figure illustrates a case where N-number of subcarriers $SC_{11}$ to $SC_{1N}$ are used upon being assigned exclusively to user 1, and multicode multiplexing is performed upon assigning first and second orthogonal codes $C_{11}$ to $C_{1N}$, $C_{21}$ to $C_{2N}$ to user 1. With regard also to other users, N-number of other subcarriers are used upon being assigned exclusively and a plurality of orthogonal codes are assigned to perform multicode multiplexing. The subcarrier signals of each of the users are frequency-multiplexed by a frequency multiplexer 158.

A data modulator 151 modulates transmit data of user 1 and converts it to a complex baseband signal sequence (symbol sequence) having an in-phase component and a quadrature component. A time multiplexer 152 time-multiplexes the pilot of the plurality of symbols to the front of the transmit data. In order to transmit by pointing a beam in a direction in which the user 1 is present, a beam forming unit 153 branches an input symbol to four paths, multiplies each branched symbol by array weights $W_1$ to $W_4$ and inputs the results of multiplication to MC-CDMA units $154_1$ to $154_4$ for antennas 1 to 4 constituting an array antenna. The array weights $W_1$ to $W_4$ are decided in a controller (not shown) by detecting the direction of the mobile station and making the decision so as to transmit the beam in this direction. Since this technique is well known, it will not be described here in detail. Further, since the MC-CDMA units $154_1$ to $154_4$ are identically constructed and operate in the same manner, only the operation of MC-CDMA unit $154_1$ will be described below.

A serial/parallel converter 155 converts the input data to parallel data of M symbols (M=2 in this embodiment), and each symbol is input to first and second spreaders $156_1$, $156_2$ upon being branched into N paths.

The first spreader $156_1$ has N-number of multipliers. The multipliers multiply the N-number of branched symbols individually by respective ones of the codes $C_{11}$, $C_{12}$, . . . , $C_{1N}$ constituting the first orthogonal codes and output the resulting signals. Further, the second spreader $156_2$ also has N-number of multipliers. The multipliers multiply the N-number of branched symbols individually by respective ones of the codes $C_{21}$, $C_{22}$, . . . , $C_{2N}$ constituting the second orthogonal codes and output the resulting signals. A combiner 157 has N-number of adders. Each adder adds the outputs of the corresponding multipliers in the first and second spreaders $156_1$, $156_2$, and the adders output subcarrier signals $S_1$ to $S_N$. The subcarrier signals $S_1$ to $S_N$ are multicode multiplexed signals obtained by multiplexing results of spreading the two symbols by respective ones of the orthogonal codes $C_{11}$ to $C_{1N}$, $C_{21}$ to $C_{2N}$.

The frequency multiplexer 158 frequency-multiplexes the subcarrier signals of user 1 and the similarly generated subcarrier signals of the other users, and a frequency interleaver 159 rearranges the code-multiplexed subcarriers by frequency interleaving, thereby distributing the subcarrier signals along the frequency axis, in order to obtain frequency-diversity gain. An IFFT unit 160 applies an IFFT (Inverse Fast Fourier Transform) to the subcarrier signals that enter in parallel, thereby effecting a conversion to an OFDM signal (a real-part signal and an imaginary-part signal) on the time axis. A guard-interval insertion unit 161 inserts a guard interval into the OFDM signal, an orthogonal modulator (not shown) applies orthogonal modulation to the OFDM signal into which the guard interval has been inserted, and a radio transmitter up-converts the signal to a radio frequency, applies high-frequency amplification and inputs the resulting signal to antenna 1 constituting an array antenna. Similarly, signals weighted in accordance with the transmission direction are input to other antennas 2 to 4 constituting the antenna array. As a result, data can be transmitted to user 1 by the directional beam pointing toward user 1, and data can be transmitted similarly to the other users by directional beams pointing toward these other users.

Thus, by carrying out beam forming in a downlink, subcarriers that differ for every user are used even in a case where fading experienced by each user differs. As a result, orthogonality of spreading codes is not lost and the superior characteristics of MC-CDMA schemes can be maintained.

Figure 6:
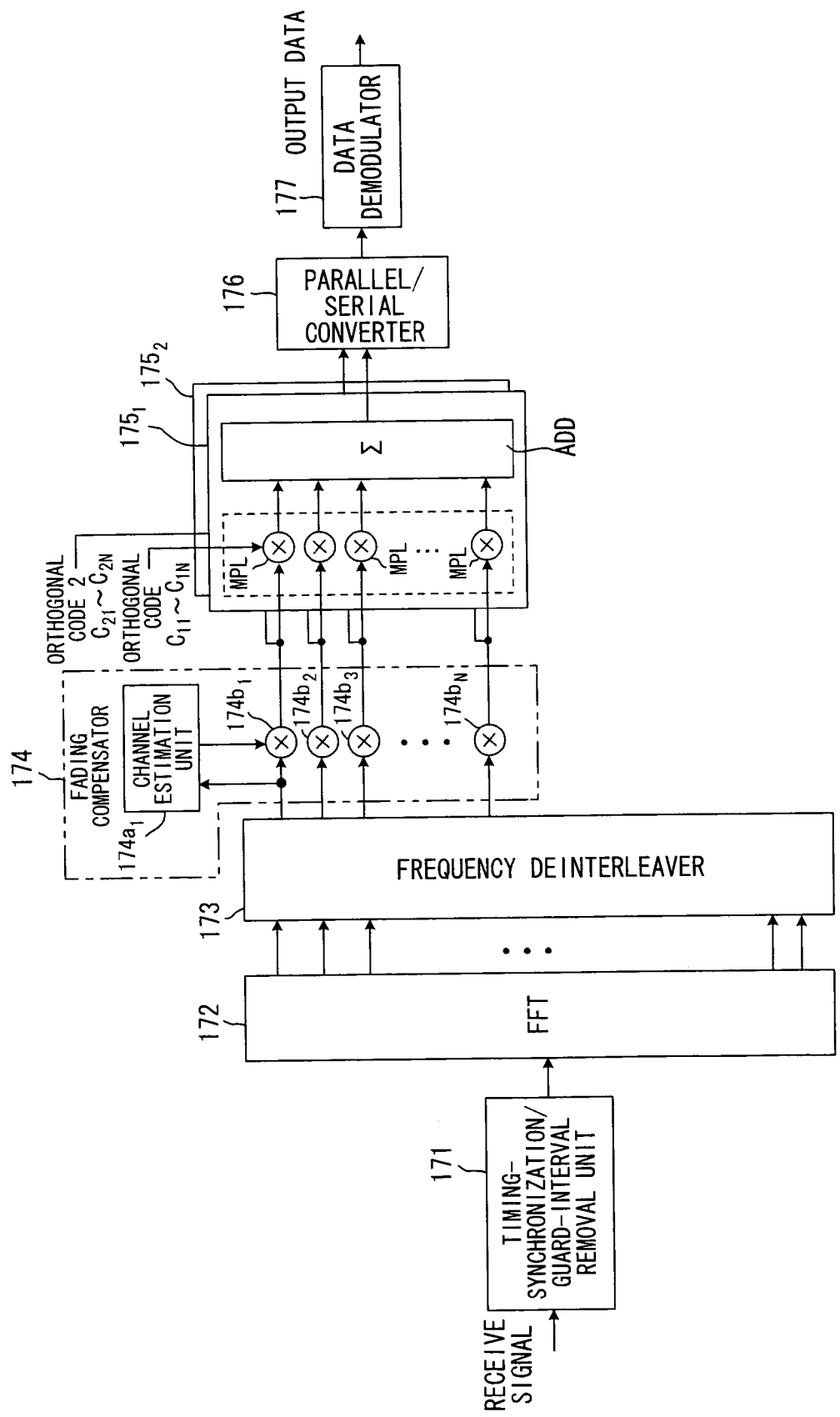
FIG. 6 is a block diagram of the receiving side of a mobile station in a case where a base station transmits data by an MC-CDMA scheme using transmit beam forming.

FIG. 6 is a block diagram of the receiving side of a mobile station according to the second embodiment in a case where a base station transmits data by an MC-CDMA scheme using transmit beam forming.

A radio receiver subjects a received multicarrier signal to frequency conversion processing, and an orthogonal demodulator subjects the receive signal to orthogonal demodulation processing and inputs the processed signal to a timing-synchronization/guard-interval removal unit 171.

The latter establishes receive-signal timing synchronization, subsequently removes the guard interval GI from the receive signal and inputs the result to an FFT unit 172. The FFT unit 172 converts a signal in the time domain to a number of subcarrier signals. If we let N represent the number of subcarriers assigned exclusively to each user and let m represent the number of users that a single base station can accommodate, then the FFT unit 172 will output m×N subcarrier signals. A frequency deinterleaver 173 rearranges the subcarrier signals in an order opposite that on the transmitting side and, in the order of the subcarrier frequencies, inputs N-number of subcarriers that have been assigned thereto to a fading compensator 174.

After deinterleaving is carried out, the fading compensator 174 performs channel estimation on a per-subcarrier basis using the pilot time-multiplexed on the transmitting side and applies fading compensation. In the Figure, a channel estimation unit $174a_1$ is illustrated only in regard to one subcarrier. However, such a channel estimation, unit is provided for every subcarrier. The channel estimation unit $174a_1$ estimates the influence $\exp(j\Phi)$ of fading on phase using the pilot signal, and a multiplier $174b_1$ multiplies the subcarrier signal of the transmit symbol by $\exp(-j\Phi)$ to compensate for fading. Like the multiplier $174b_1$, multipliers $174b_2$-$174b_N$ compensate for fading.

First and second despreaders $175_1$, $175_2$ each have N-number of multipliers MPL and one adder ADD. The multiplier MPL of the first despreader $175_1$ multiplies N-number of subcarriers individually by codes $C_{11}$, $C_{12}, \ldots, C_{1N}$ constituting the first orthogonal codes assigned to the user, and the adder ADD adds the results of multiplication from each of the multipliers and outputs the result as the first symbol of parallel data. The multiplier MPL of the second despreader $175_2$ multiplies N-number of subcarriers individually by codes $C_{21}$, $C_{22}, \ldots, C_{2N}$ constituting the second orthogonal codes assigned to the user, and the adder ADD adds the results of multiplication from each of the multipliers and outputs the result as the second symbol of parallel data.

A parallel/serial converter 176 converts this parallel data comprising two symbols to serial data, and a data demodulator 177 demodulates the transmit data.

Figure 7:
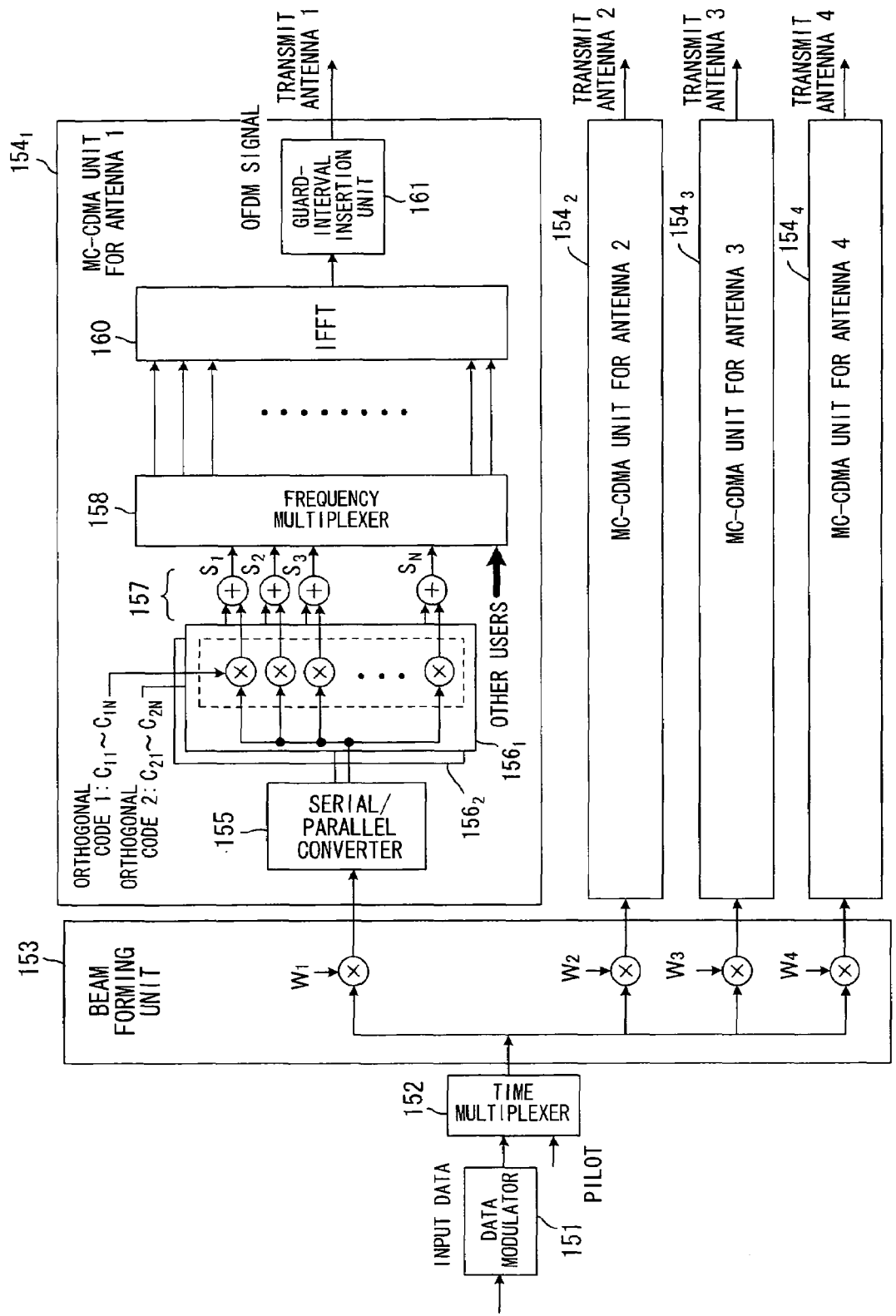
FIG. 7 is a modification of FIG. 5 for a case where a frequency interleaver on the transmitting side has been deleted.
Figure 8:
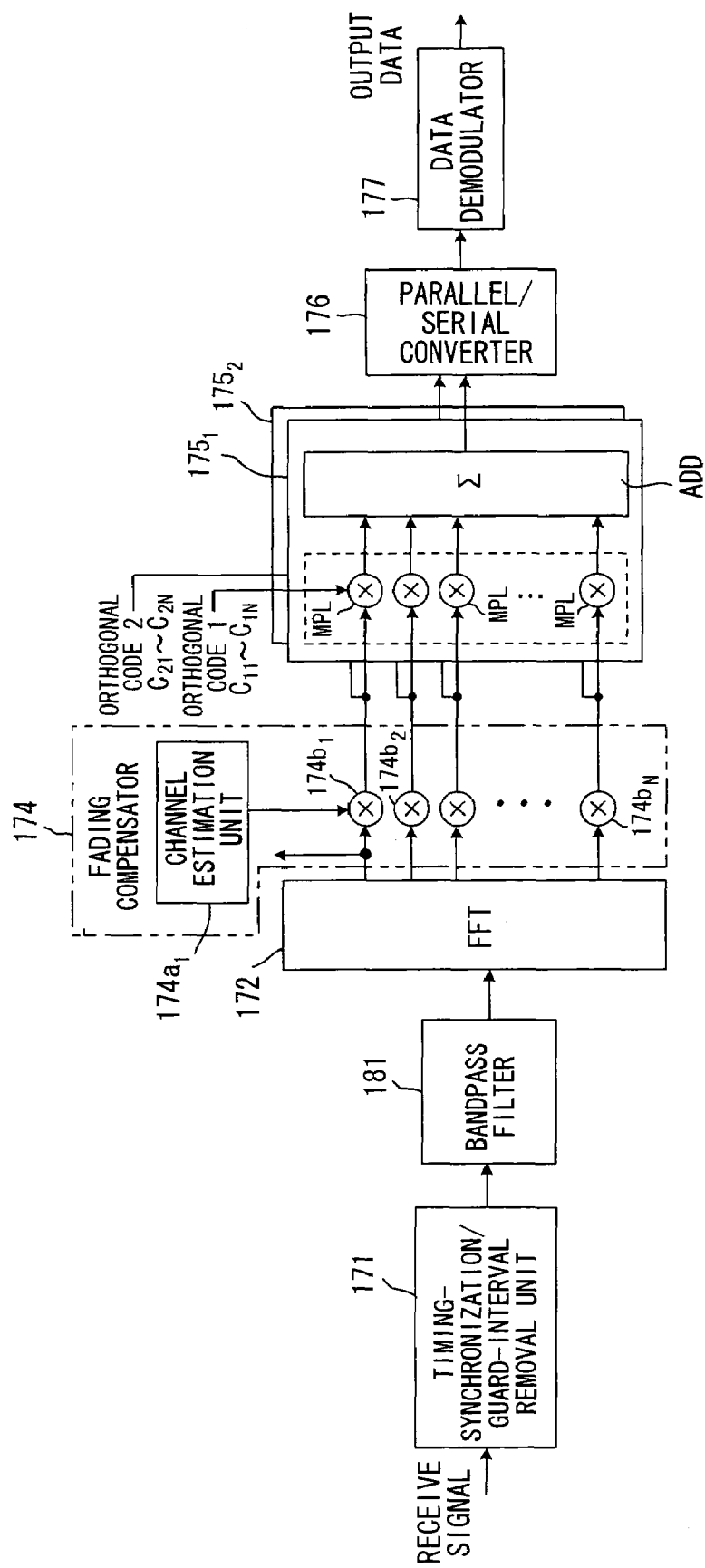
FIG. 8 is a modification of FIG. 6 for a case where a frequency deinterleaver on the receiving side has been deleted.

FIGS. 7 and 8 are modifications of FIGS. 5 and 6, respectively, and have structures in which the frequency interleaver and frequency deinterleaver have been deleted from the base station and mobile station, respectively.

Since frequency interleaving is not carried out, it will suffice if the mobile station of FIG. 8 executes FFT processing using only the N-number of subcarriers that have been assigned to it. To accomplish this, the mobile station is provided with a bandpass filter 181, which has a frequency band conforming to the N-number of subcarriers assigned to this mobile station, in front of the FFT unit 172, whereby the mobile station is imparted with the structure of a narrowband receiver. If this arrangement is adopted, FFT having a small number of stages can be utilized. This is advantageous in that the processing load of FFT can be mitigated.

(D) Third Embodiment

Figure 9:
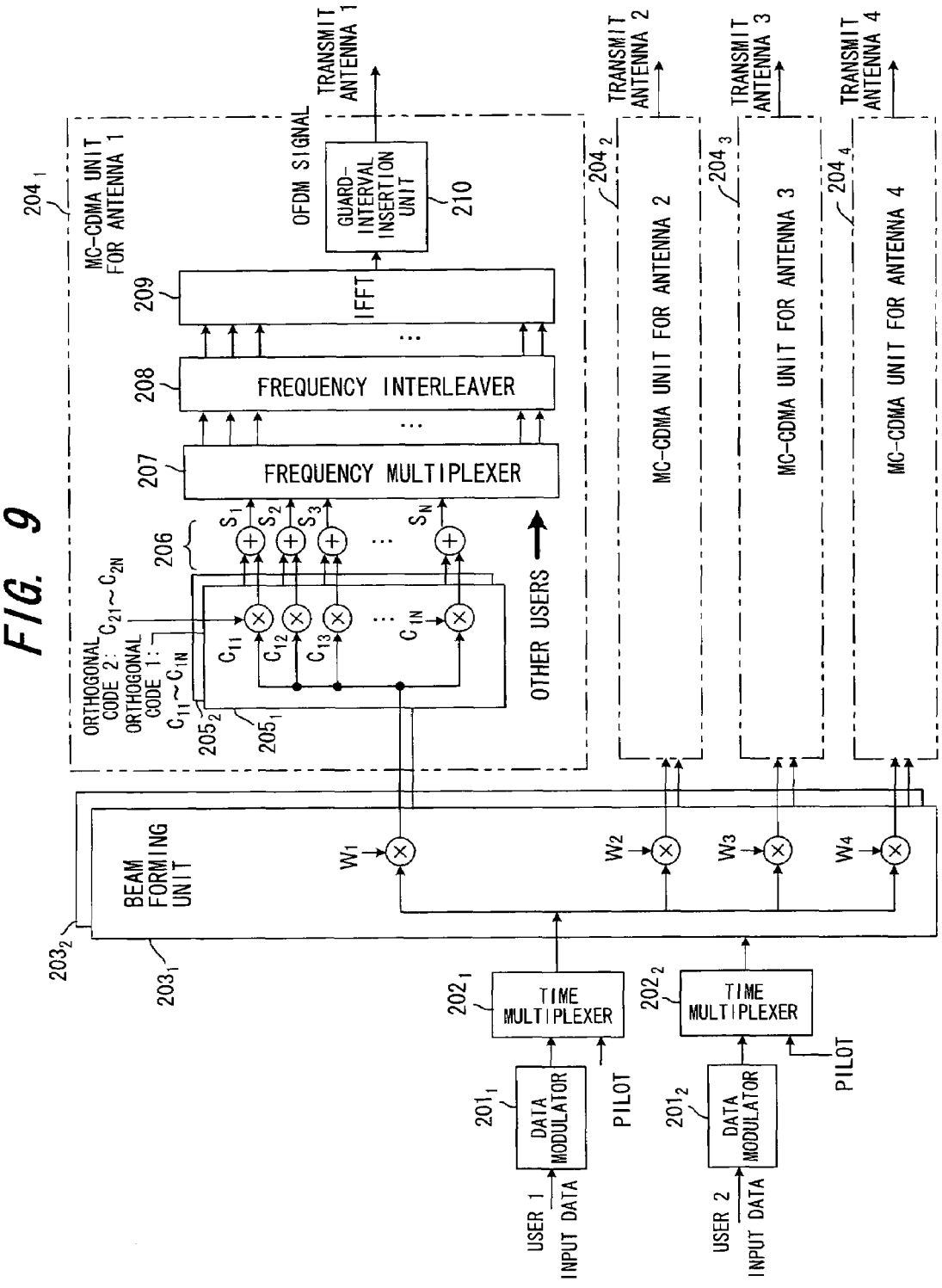
FIG. 9 is a block diagram of a base station according to a third embodiment.
Figure 12:
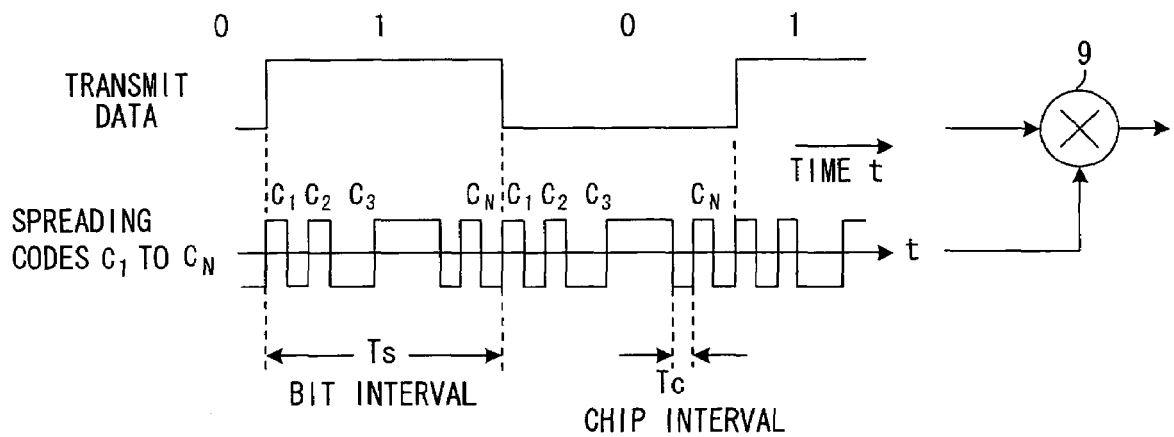
FIG. 12 is a diagram useful in describing code spreading modulation in CDMA.
Figure 13:
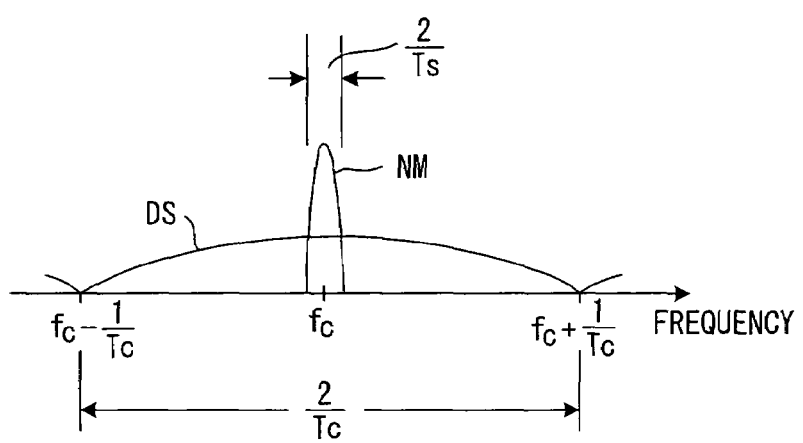
FIG. 13 is a diagram useful in describing spreading of a band in CDMA.
Figure 14:
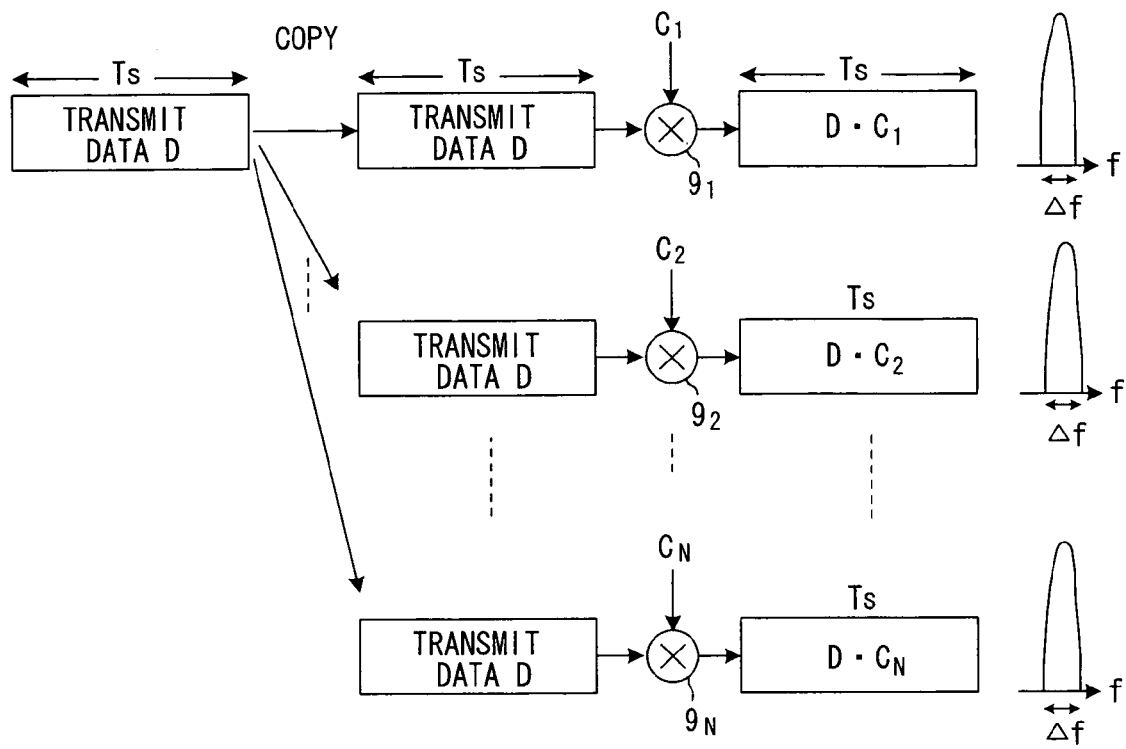
FIG. 14 is a diagram useful in describing the principle of a multicarrier CDMA scheme.
Figure 15:
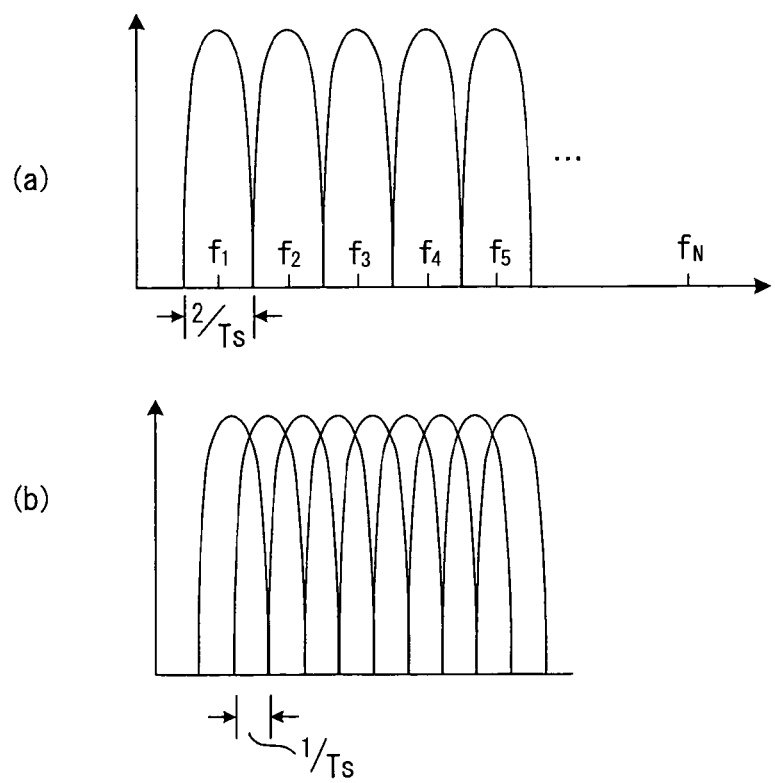
FIG. 15 is a diagram useful in describing placement of subcarriers.
Figure 16:
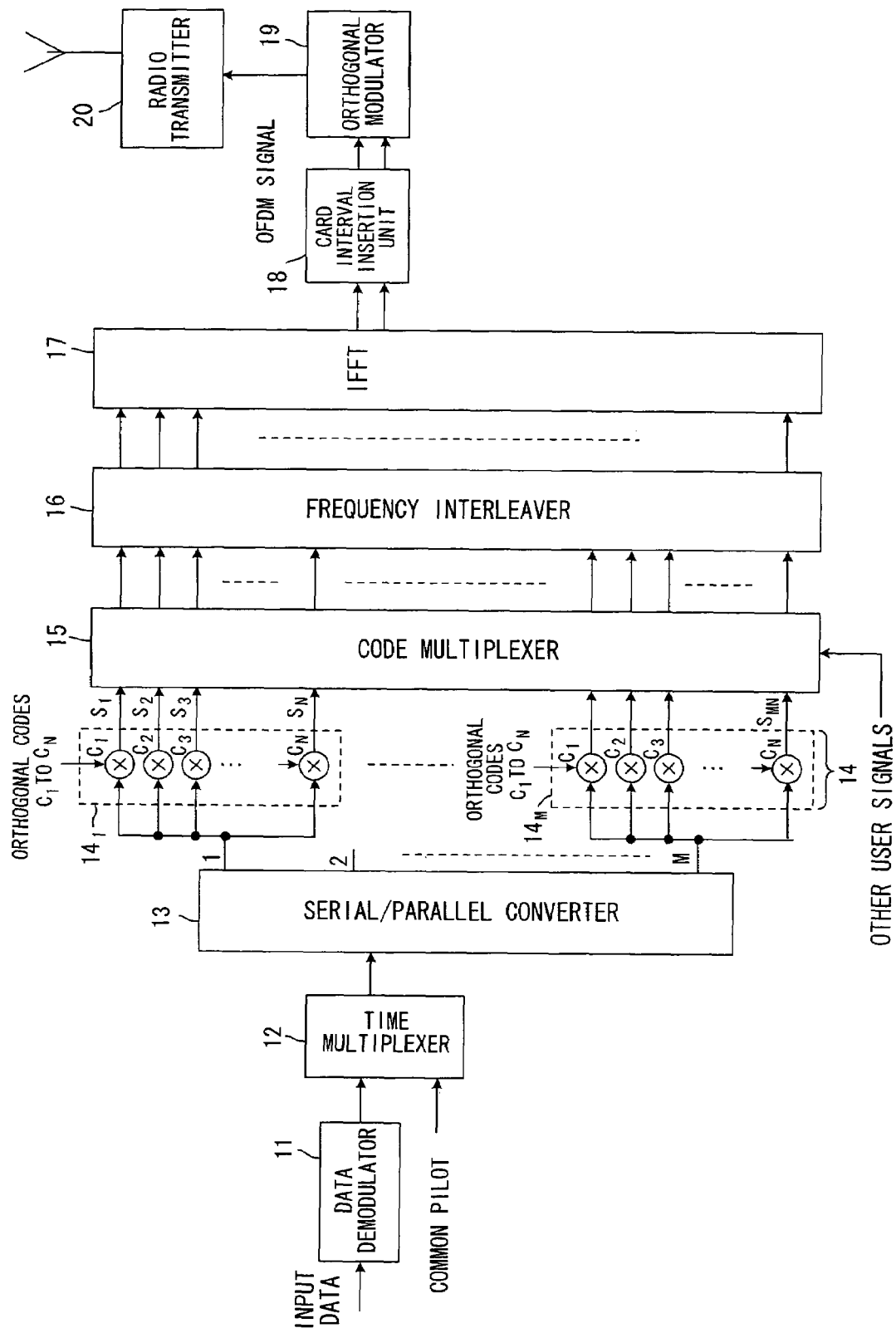
FIG. 16 is a block diagram of a transmitting side in MC-CDMA according to the prior art.
Figure 17:
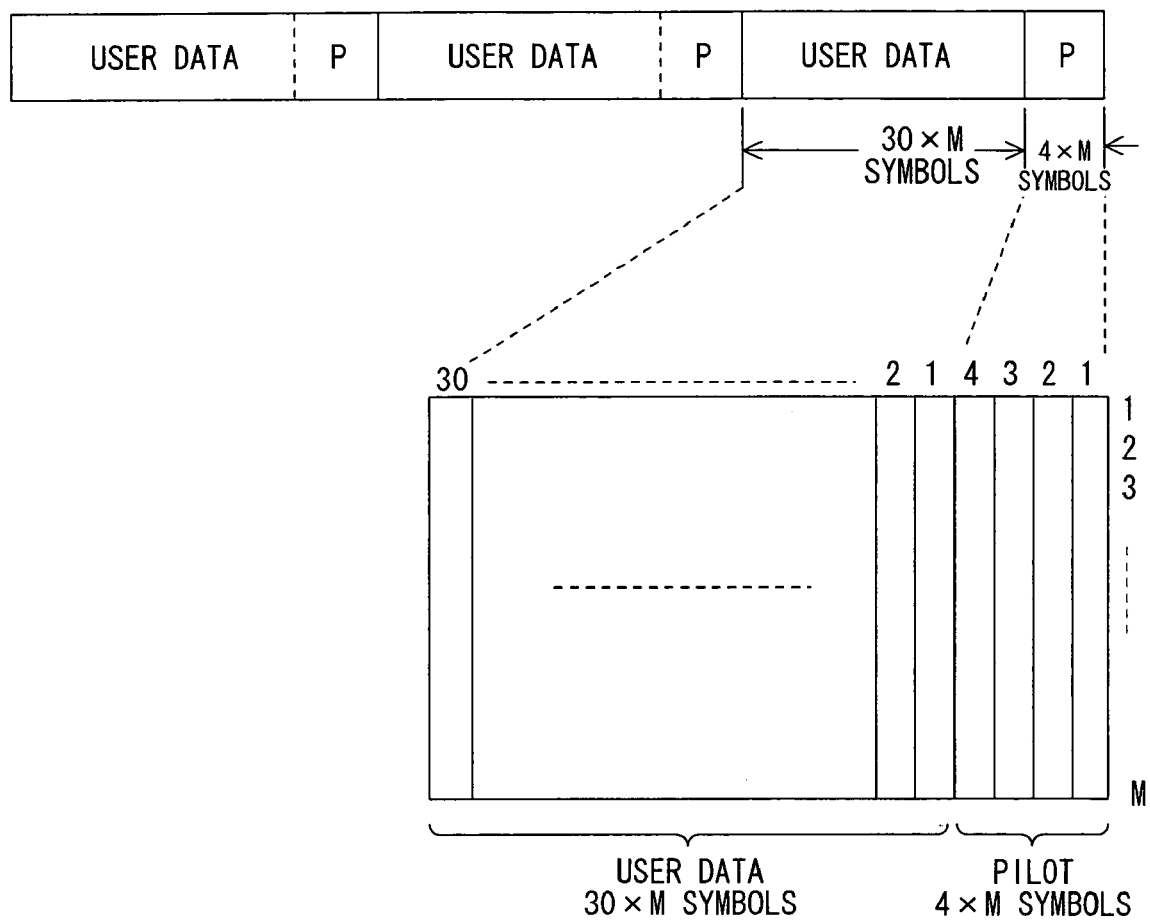
FIG. 17 is a diagram useful in describing a serial-to-parallel conversion.
Figure 18:
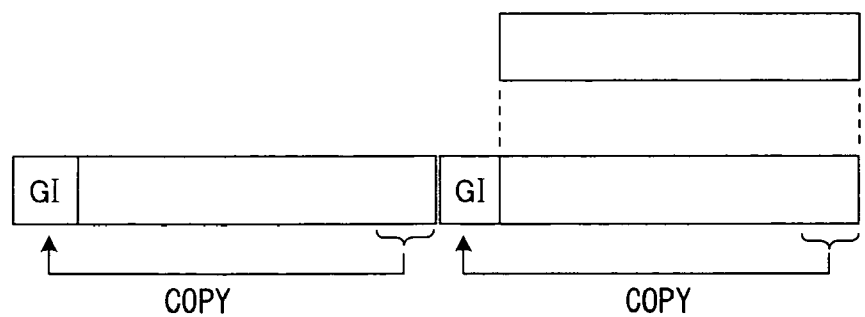
FIG. 18 is a diagram useful in describing a guard interval.
Figure 19:
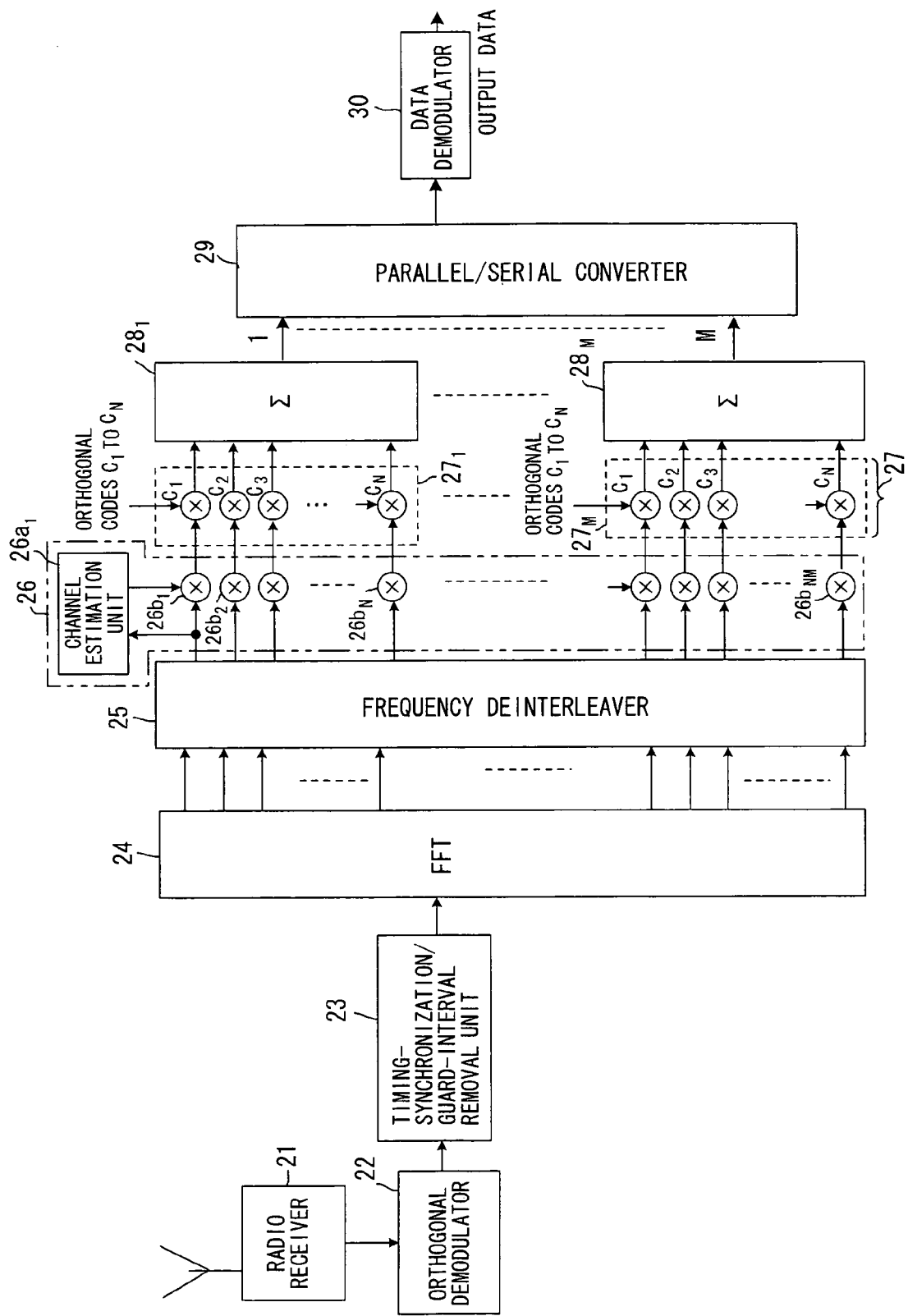
FIG. 19 is a block diagram of a receiving side in MC-CDMA according to the prior art.
Figure 20:
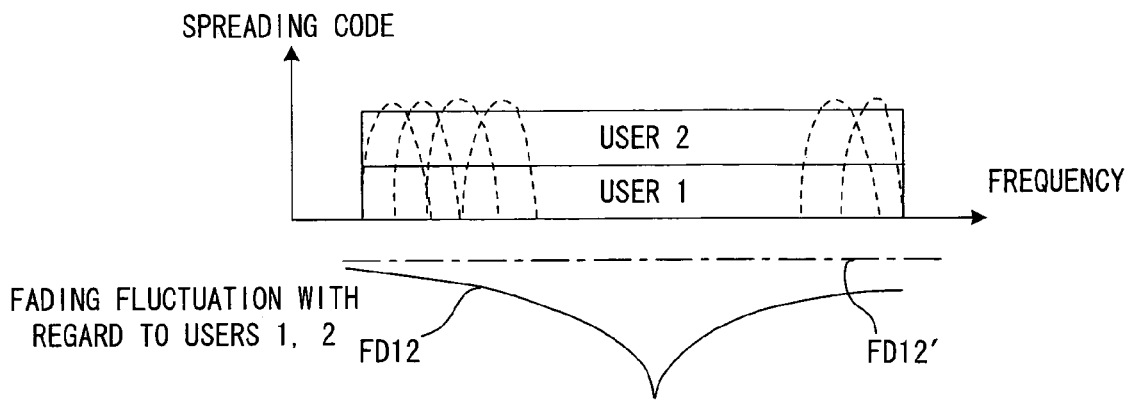
FIG. 20 is an explanatory view illustrating the state of MC-CDMA fading fluctuation in a downlink from a base station
Figure 21:
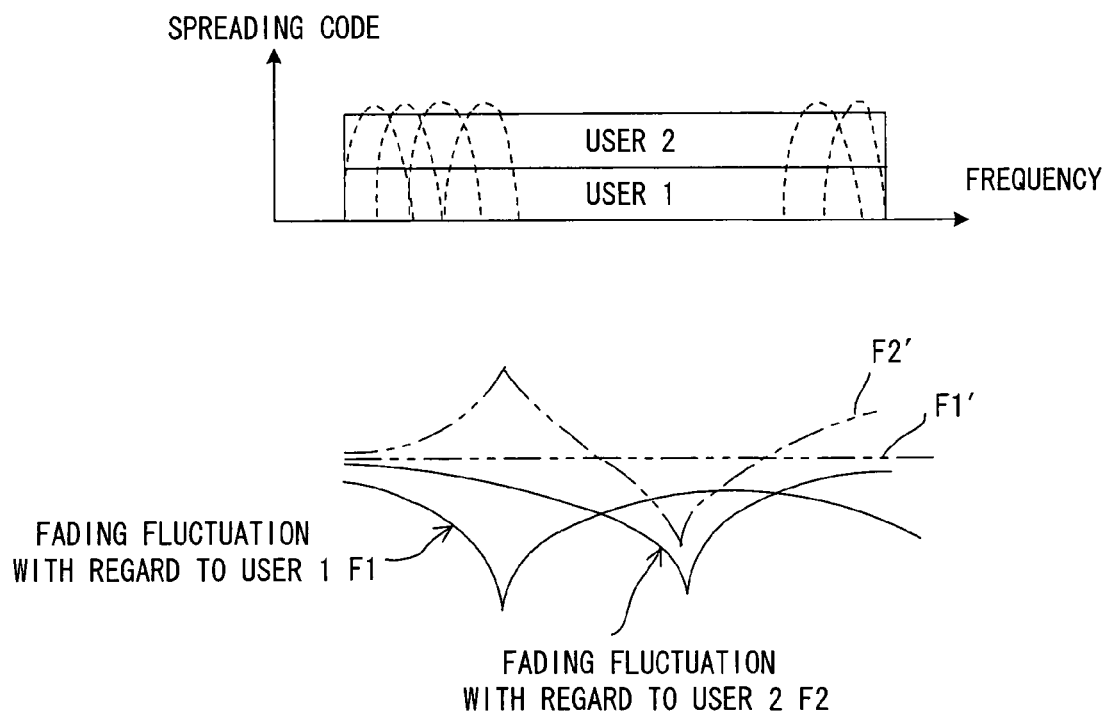
FIG. 21 is an explanatory view of fading fluctuation user by user in a case where an MC-CDMA scheme has been applied to an uplink (origination of a call from a mobile station)
Figure 22:
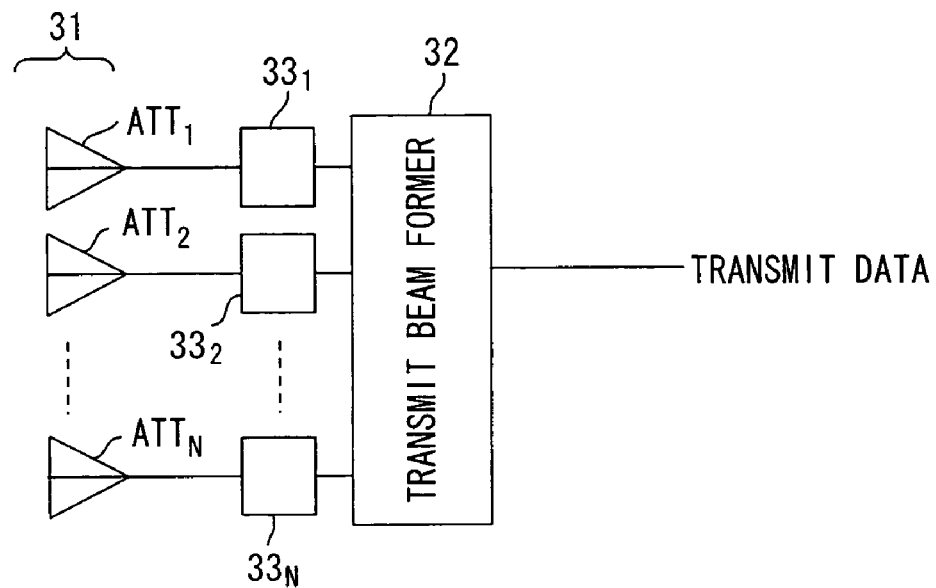
FIG. 22 is a diagram useful in describing beam forming.

FIG. 9 is a block diagram of a base station according to a third embodiment of the present invention. It can be assumed that the mobile station will have a structure similar to that shown in FIG. 6. The third embodiment is applicable to a case where the base station transmits, using the same directional beam, to a plurality of users belonging to the same directional zone. The Figure illustrates a case where users 1, 2 are present in the same directional zone, N-number of subcarriers conforming to this directional zone have been assigned to users 1, 2, and different sets of orthogonal codes $C_{11}$ to $C_{1N}$, $C_{21}$ to $C_{2N}$ have been assigned to users 1, 2.

A data modulator $201_1$ modulates transmit data of user 1 and converts it to a complex baseband signal sequence (symbol sequence) having an in-phase component and a quadrature component. A time multiplexer $202_1$ time-multiplexes the pilot of the plurality of symbols to the front of the transmit data of user 1. In order to transmit by pointing a beam a direction in which the user 1 is present, a beam forming unit $203_1$ branches an input symbol to four paths, multiplies each branched symbol by array weights $W_1$ to $W_4$ and inputs the results of multiplication to MC-CDMA units $204_1$ to $204_4$ for antennas 1 to 4 constituting an array antenna.

Similarly, a data modulator $201_2$ modulates transmit data of user 2 and converts it to a complex baseband signal sequence (symbol sequence) having an in-phase component and a quadrature component. A time multiplexer $202_2$ time-multiplexes the pilot of the plurality of symbols to the front of the transmit data of user 2. It should be noted that the time multiplexer $202_2$ can be deleted by adopting a common pilot for users 1, 2. In order to transmit by pointing a beam in a direction in which the user 2 is present, a beam forming unit $203_2$ branches an input symbol to four paths, multiplies each branched symbol by array weights $W_1$ to $W_4$ and inputs the results of multiplication to the MC-CDMA units $204_1$ to $204_4$ for antennas 1 to 4 constituting the array antenna.

Since the MC-CDMA units $204_1$ to $204_4$ are identically constructed and operate in the same manner, only the operation of MC-CDMA unit $204_1$ will be described below.

The result of multiplication by weight $W_1$ that is output from the beam forming unit $203_1$ is branched into N paths and enters a despreader $205_1$ for user 1. The spreader $205_1$ has N-number of multipliers. The multipliers multiply the N-number of branched symbols individually by respective ones of the codes $C_{11}$, $C_{12}, \ldots, C_{1N}$ constituting the orthogonal codes for user 1 and output the resulting signals. Similarly, the result of multiplication by weight $W_1$ that is output from the beam forming unit $203_2$ is branched into N paths and enters a despreader $205_2$ for user 2. The spreader $205_2$ has N-number of multipliers. The multipliers multiply the N-number of branched symbols individually by respective ones of the codes $C_{21}$, $C_{22}, \ldots, C_{2N}$ constituting the orthogonal codes for user 2 and output the resulting signals.

A combiner 206 has N-number of adders. Each adder adds the outputs of the corresponding multipliers in the spreaders $205_1$, $205_2$ of users 1, 2, and the adders output subcarrier signals $S_1$ to $S_N$. The subcarrier signals $S_1$ to $S_N$ are multi-code multiplexed signals obtained by multiplexing results of spreading the symbols of users 1, 2 by respective ones of the orthogonal codes $C_{11}$ to $C_{1N}$, $C_{21}$ to $C_{2N}$.

A frequency multiplexer 207 frequency-multiplexes the subcarrier signals of users 1, 2 and the similarly generated subcarrier signals of the other users, and a frequency interleaver 208 rearranges the code-multiplexed subcarriers by frequency interleaving, thereby distributing the subcarrier signals along the frequency axis, in order to obtain frequency-diversity gain. An IFFT unit 209 applies an IFFT (Inverse Fast Fourier Transform) to the subcarrier signals that enter in parallel, thereby effecting a conversion to an OFDM signal (a real-part signal and an imaginary-part signal) on the time axis. A guard-interval insertion unit 210 inserts a guard interval into the OFDM signal, an orthogonal modulator (not shown) applies orthogonal modulation to the OFDM signal into which the guard interval has been inserted, and a radio transmitter up-converts the signal to a radio frequency, applies high-frequency amplification and inputs the resulting signal to antenna 1 constituting an array antenna. Similarly, signals weighted in accordance with the transmission direction are input to the other antennas 2 to 4 constituting the antenna array. As a result, data can be transmitted to users 1, 2 by the directional beam pointing toward users 1, 2, and data can be transmitted similarly to the other users by directional beams pointing toward these other users.

Thus, subcarriers that differ for every user are used even in a case where fading experienced by prescribed users residing in different directional zones differs. As a result, orthogonality of spreading codes is not lost and the superior characteristics of MC-CDMA schemes can be maintained.

The foregoing relates to a case where one orthogonal code is assigned to each user. However, a plurality (=M) of orthogonal codes can be assigned. In such case, one serial/parallel converter and M-number of spreaders are provided for one user and an arrangement similar to that of FIG. 5 is adopted.

Thus, in accordance with the present invention, orthogonality of spreading codes is not lost and excellent characteristics can be obtained in an uplink.

Further, in accordance with the present invention, it is possible to avoid loss of orthogonality and obtain excellent characteristics in a downlink in a case where beam forming is applied.

Further, in accordance with the present invention, excellent channel estimation accuracy can be obtained by using individual pilots.

Further, in accordance with the present invention, a narrow-band receiver can be used, the number of arithmetic stages in FFT can be reduced and the FFT processing load can be mitigated.

Further, in accordance with the present invention, frequency interleaving is used. As a result, excellent frequency-diversity gain can be obtained even in a case where only some subcarriers are used.

What is claimed is:

1. A multicarrier transmission method for multiplying transmit data individually by each code constituting orthogonal codes and transmitting each result of multiplication by a prescribed subcarrier, comprising the steps of:
    assigning the same subcarriers selected from among multicarriers to a plurality of users and assigning plural different orthogonal codes to each user;
    applying identical transmit beam-forming processing to the transmit data of said plurality of users, which belong to a same directional zone and to which the same subcarriers have been assigned; and
    transmitting the beam-formed data of each user by the beam-forming processing by performing code multiplexing using said plural different orthogonal codes on the same subcarriers.

2. A transmitting apparatus of a base station in a multicarrier CDMA transmission system for multiplying user data individually by each code constituting orthogonal codes and transmitting each result of multiplication by a prescribed subcarrier, comprising:
    an array antenna comprising a plurality of antenna elements;
    a beaming forming unit for applying beam-forming processing to transmit data of a user and generating transmit data for each antenna element;
    a multiplier, which is provided for every antenna element, for multiplying one symbol of transmit data, to which the beam-forming processing has been applied, individually by each code constituting orthogonal codes that have been assigned to a user; and
    a transmitting unit, which is provided for every antenna element, for performing multicarrier transmission of results of multiplication by a plurality of subcarriers that have been assigned on a per-user basis.

3. A transmitting apparatus of a base station according to claim 2, wherein a plurality of identical carriers are assigned to a plurality of users, different orthogonal codes are assigned to each user, code multiplexing is performed on the same carriers on a per-antenna basis and transmit data of each user is transmitted.

4. A transmitting apparatus of a base station in a multicarrier CDMA transmission system for multiplying user data individually by each code constituting orthogonal codes, outputting results of multiplication and transmitting each result of multiplication by a prescribed subcarrier, comprising:
    an array antenna comprising a plurality of antenna elements;
    a beaming forming unit for applying beam-forming processing to transmit data of a user and generating transmit data for each antenna element;
    a serial/parallel converter, which is provided for every antenna element, for converting transmit data, to which the beam-forming processing has been applied, to parallel data;
    a multiplier, which is provided for every antenna element, for multiplying one symbol of parallel data, which has been obtained by the serial-to-parallel conversion, separately by each code constituting orthogonal codes that have been assigned to a user and similarly multiplying each symbol of the parallel data individually by each code constituting other orthogonal codes that have been assigned to said user;
    a combiner, which is provided for every antenna element, for combining results of multiplication by corresponding codes of each of the orthogonal codes; and
    a transmitting unit, which is provided for every antenna element, for performing multicarrier transmission of each of the combined results by a plurality of subcarriers that have been assigned on a per-user basis.

* * * * *